US009621278B2

(12) United States Patent
Hosokawa et al.

(10) Patent No.: US 9,621,278 B2
(45) Date of Patent: Apr. 11, 2017

(54) FREQUENCY OFFSET COMPENSATION APPARATUS AND FREQUENCY OFFSET COMPENSATION METHOD

(71) Applicant: NEC Corporation, Minato-ku, Tokyo (JP)

(72) Inventors: Kohei Hosokawa, Tokyo (JP); Yuichi Nakamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/651,037

(22) PCT Filed: Dec. 11, 2013

(86) PCT No.: PCT/JP2013/007289
§ 371 (c)(1),
(2) Date: Jun. 10, 2015

(87) PCT Pub. No.: WO2014/097583
PCT Pub. Date: Jun. 26, 2014

(65) Prior Publication Data
US 2015/0311983 A1    Oct. 29, 2015

(30) Foreign Application Priority Data
Dec. 20, 2012    (JP) .................................. 2012-277818

(51) Int. Cl.
*H04B 10/00*    (2013.01)
*H04B 10/61*    (2013.01)
*H04J 14/00*    (2006.01)

(52) U.S. Cl.
CPC ................................ *H04B 10/6164* (2013.01)

(58) Field of Classification Search
CPC .................................................. H04B 10/6164
USPC ................................................... 398/202–211
See application file for complete search history.

(56) References Cited

U.S. PATENT DOCUMENTS

2012/0087680 A1*    4/2012    Xie ........................ H04B 10/60
398/208

FOREIGN PATENT DOCUMENTS

| JP | 2009-135930 A | 6/2009 |
| WO | 2010-268210 A | 11/2010 |
| WO | 2011-007803 A1 | 1/2011 |
| WO | 2011-158932 A1 | 12/2011 |

OTHER PUBLICATIONS

English Translation of written opinion for PCT Application No. PCT/JP2013/007289, mailed on Mar. 4, 2014.*
International Search Report for PCT Application No. PCT/JP2013/007289, mailed on Mar. 4, 2014.

* cited by examiner

*Primary Examiner* — Daniel Dobson

(57) ABSTRACT

A frequency offset compensation apparatus includes: first FFT means for performing a discrete-time Fourier transform of an input signal; second FFT means for performing a discrete-time Fourier transform; and offset compensation means for changing an order of output data of the first FFT means according to a frequency offset compensation amount, and rearranging the output data, and then inputting the output data to the second FFT means. This makes possible a frequency offset compensation without needing a new complex multiplier or a new memory in optical communication.

10 Claims, 26 Drawing Sheets

… …

FREQUENCY OFFSET COMPENSATION APPARATUS AND FREQUENCY OFFSET COMPENSATION METHOD

This application is a National Stage Entry of PCT/JP2013/007289 filed on Dec. 11, 2013, which claims priority from Japanese Patent Application 2012-277818 filed on Dec. 20, 2012, the contents of all of which are incorporated herein by reference, in their entirety.

TECHNICAL FIELD

The present invention relates to a frequency offset compensation technology for a coherent optical receiver in optical communication.

BACKGROUND ART

In recent years, due to the wide-spread use of the Internet, cellular phone terminals, and the like, the amount of data communication has increased, and the communication traffic capacity handled by optical communication networks is increasing at a rate of four times in three years. In order to meet the demand for increased transmission capacity, a digital coherent optical communication technology that allows adoption of a high-transmission efficiency quadrature amplitude modulation (QAM) or the like is drawing attention.

The digital coherent optical communication technology needs, at a receiver, a local light in which the carrier waves are completely equal in frequency and phase (a local oscillating laser 201 in FIG. 2). However, in reality, it is very difficult to make equal the frequency and phase of the laser of a sender present at a different location and the frequency and phase of the laser of a receiver. Therefore, on electrical signals of a base band at the reception side, there occurs a non-zero intermediate frequency, in other words, a frequency offset. At present, the oscillatory frequency error of lasers used for commercial purposes is ±2.5 GHz at maximum, and therefore the frequency offset reaches a maximum of ±5 GHz.

As technologies for compensating this frequency offset in an optical communication system, there can be cited a method that uses an optical PLL (Phase Locked Loop), a method that compensates the frequency offset by digital signal processing, and the like. As a technology for compensating the frequency offset by digital signal processing, there are a method of NPL 1 and a method of PTL 1 (FIG. 2). FIG. 2 is a construction example of an optical digital coherent receiver based on digital signal processing. Input light mixes, in an optical frequency mixer 200, with light from a local oscillating laser 201, and travels to a PD (photodiode) 202 and an ADC (analog-digital converter) 203. In the method of PTL 1, a frequency offset estimator 207 calculates a frequency offset compensation amount, and a frequency offset compensator 204 carries out that compensation. In order to cancel out the phase added as an offset, the compensation is carried out by performing complex multiplication by a phase that has the same phase amount but is opposite in value to that phase.

At present, the speed of an optical communication that is being studied and developed is above 100 Gbps, but a digital signal processing unit 210 can be operated only at about several gigahertzes at highest. In order to fill this speed gap, arranging a plurality of the same circuits to carry out the compensation is adopted; for example, in the frequency offset compensator 204, a plurality of complex multipliers for multiplication by an opposite phase are arranged. More specifically, 100 or more complex multipliers are prepared, and the scale thereof is of an order of several megagates.

On the other hand, the digital signal processing unit 210 contains, besides this frequency offset compensator 204, various circuits such as an equalizer 205 that performs wavelength dispersion compensation, polarization separation, and the like, an integrator 206, a phase estimator 208 that estimates the phase of a carrier wave, and a data restoration 209. In particular, as for the wavelength dispersion compensation included in the equalizer 205, a time-domain FIR (Finite Impulse Response) filter is excessively large in circuit scale, and therefore the compensation is performed in frequency domain. Accordingly, an FFT (Fast Fourier Transform) that transforms data along a time axis into a frequency and an IFFT (Inverse Fast Fourier Transform) that performs a process opposite to the FFT are also included in the digital signal processing unit 210. Then, the size (the number of points) needed for the FFT or the IFFT varies depending on the wavelength dispersion compensation amount; the size is 4096 points, or needs to be about 16384 points when the amount to compensate is large.

As an efficient FFT/IFFT, butterfly computation based on Cooley-Tukey (NPL 2) is famous; however, the FFT/IFFT based on Cooley-Tukey, whose number of points is great, results in a complicated circuit. Therefore, division into two small FFTs/IFFTs based on a Prime Factor method (NPL 3) is adopted to perform processing. FIG. 3 is a diagram in which a 4096-point FFT/IFFT has been decomposed into two 64-point FFTs 302 by using the Prime Factor method.

In a digital coherent receiver of more than 100 Gbps, which is capable of processing if provided with 128 parallel, an FFT block 301 in FIG. 3 is mounted as a physical hardware component. However, in the description that follows, to simplify the description, 64 parallel (FFT block 300) is assumed instead of 128 parallel (FFT block 301) to give descriptions. Furthermore, each 64-point FFT may be decomposed into 8×8 by the method of Cooley-Tukey or other techniques, or also by the Prime Factor method.

Next, flow of data in FIG. 2 and, in particular, the order in which data are arranged will be described through the use of the drawings. FIG. 6 is an enlarged view exhibiting an analog/digital converter (hereinafter, ADC 203), a frequency offset compensator 204, and an equalizer 205 in FIG. 2. Inside the equalizer 205, there are included an FFT 602, a filter computation (complex multiplier) 603, and an IFFT 604 for performing the wavelength dispersion compensation in frequency domain. Furthermore, although not depicted in FIG. 6, many functions, such as polarization separation, are mounted.

First of all, arrangement of data in the ADC 203 will be described. Data output from a typical ADC 203 are as indicated in FIG. 4. Note that time 1 represents a sampling gap of the ADC. For example, in the case of an ADC 203 of 64 G samples/sec, the sampling interval is 15.625 ps (=1 sec/64 G samples), and therefore, time 1 is sampled waveform data at 15.625 ps, time 2 at 31.25 ps, and time 127 at 1984.375 (=127×15.625) ps. However, since the operating frequency of typical digital circuits is several gigahertzes at most, it is impossible to receive a piece of data in one clock cycle. Therefore, data output from the ADC 203 are given in an arrangement of 64 pieces in one clock cycle as in FIG. 4, and then are input to the digital signal processing unit 210.

On the other hand, as for data that need to be input to the FFTs, it can be understood from FIG. 3 that the data to be input in the 1st cycle are x[0], x[64], ... x[63×64], and the data to be input in the 2nd cycle are x[1], x[65], ...

x[63×64+1]. Therefore, the order in which data are input to the FFTs is as in FIG. 5, which similarly applies to the case of IFFTs. Note that x represents an input signal to an FFT and y represents an output signal of an FFT. If FIG. 4 and FIG. 5 are compared, it can be understood that the outputs from the ADC and the inputs to the FFTs are different in order. Therefore, rearrangement of data is needed and, as in FIG. 6, a rearrangement-purpose memory (1) 601 and a rearrangement-purpose memory (2) 605 are needed.

Furthermore, similar rearranging is needed at a site where crossings are provided inside the FFTs (the rearrangement-purpose memory 303 in FIG. 3).

Hereinafter, data rearrangement inside an FFT in the case of a 64-parallel 4096-point FFT will be specifically described through the use of FIG. 7 and FIG. 8.

In order to perform rearrangement of data inside an FFT, a memory block as in FIG. 7 is prepared. This memory block is constructed of two sets (a rearrangement-purpose memory 303) in each of which 64 1R1W memories 701 whose width is an amount for one piece of data and whose depth is 64 words are arranged side by side (an arrangement 702 of 64 1R1W memories). Each 1R1W memory 701 is a typical 1R1W memory having a memory whose width is an amount for one piece of data and whose depth is 64 words (a memory capable of one reading process and one writing process in one cycle).

With respect to this memory block, values are written in at positions indicated in the upper-side diagram in FIG. 8. In FIG. 8, [A, B] indicates an output of a left-side FFT array in FIG. 3. In other words, 64 values [0, 0], [0, 1], ... [0, 63] calculated in the 1st cycle are written in at positions on a diagonal line where entries have been given in boldface in the upper-side diagram in FIG. 8. Likewise, [1, 0], [1, 1], ... [1, 63] in the 2nd cycle are sequentially written into the upper-side memory in FIG. 8. Such an operation is continually performed 64 times to fill the memory. Conversely, at the time of readout, the readout is performed at positions enclosed by a dotted line in the upper-side diagram in FIG. 8. Due to this, readout of [*, 0] (* is a value of 0 to 63) is performed in the 1st cycle, and readout of [*, 1] is performed in the 2nd cycle. Thus, data can be appropriately given to the FFT array on the right side in FIG. 3. In this manner, the use of 64 memories and the contrivance regarding the positions to write data as in the upper diagram in FIG. 8 makes it possible to realize the rearrangement by using only a memory capacity for one frame of the FFT (4096 pieces of data).

However, since overwrite occurs during readout from a memory, two memory sets (arrangements 702 of 64 1R1W memories) are prepared as illustrated in FIG. 7. Then, for the first writing-in, the upper-side memory group is written into, and then the lower-side memory group is written into, and then the upper-side memory group. In this manner, the writing-in is performed in order. On the other hand, at the readout side, readout is performed in the opposite order, so that the overwrite problem can be solved.

Next, the case where the frequency offset compensation is performed in frequency domain will be considered. When the offset compensation is performed in frequency domain, the offset compensation is realized by a shift to the left or right by an amount for the offset as in FIG. 9. Therefore, assuming that a signal y is a result of the FFT, it suffices that when a shift by p (p is an integer) to the left is performed, y[(n−p)%4096] (% indicates the remainder when n−p is divided by 4096) is calculated, and when a shift by p to the right is performed, y[(n+p)%4096] is calculated. In other words, when a right shift by 1 is performed, it suffices that the handling of a result of the FFT as follows: y[4095] as y[0], y[0] as y[1], y[1] as y[2], and so on, is carried out. However, as seen from FIG. 5, y[4095] is output in the 64th cycle, and in order to handle y[4095] as y[0], and y[0] as y[1], a delay of at least 64 cycles or more is needed. In other words, a mere shift to right by 1 requires a memory capable of retaining at least 4096 pieces of data, and such memories are needed in an amount of several hundred kilogates.

CITATION LIST

Patent Literature

[PTL 1] Japanese Laid-open Patent Publication No. 2009-135930

Non Patent Literature

[NPL 1] A. Leven, N. Kaneda, U. Koc, Y. Chen, "Frequency Estimation in Intradyne Reception" Photonic technology letters, Vol. 19, pp 366-368, 2007.

[NPL 2] J. W. Cooley, J. W. Tukey, "An Algorithm for the Machine Calculation of Complex Fourier Series" Mathematics of Computation, Vol. 19.

[NPL 3] D. P. Kolba, "A Prime Factor FFT Algorithm Using High-Speed Convolution" IEEE Trans. on Acoustics, Speech and Signal Processing, Vol. 29, No. 4, 1981.

SUMMARY OF INVENTION

Technical Problem

As mentioned above, a problem in performing frequency offset compensation is that when the compensation is carried out in time domain, complex multipliers are added separately from various compensation circuits, and when the compensation is carried out in frequency domain, memories for delay are likewise added. Due to this, the circuit scale of the digital signal processing unit increases. As a result, there occur problems of increased electric power consumption or reduced yield of chips.

The present invention has been accomplished in view of the foregoing issues. An object of the invention is to realize a frequency offset compensation apparatus and a frequency offset compensation method that perform frequency offset compensation without needing a new complex multiplier or a new memory.

Note that the present invention is an invention for compensating frequency offset, and not one for finding an amount of compensation. In other words, the present invention is an invention about how to perform a frequency offset compensation after a frequency offset compensation amount is given.

Solution to Problem

The frequency offset compensation apparatus of the present invention is a frequency offset compensation apparatus that includes first FFT means for performing a discrete-time Fourier transform of an input signal, second FFT means for performing a discrete-time Fourier transform, and offset compensation means for changing an order of output data of the first FFT means according to a frequency offset compensation amount, rearranging the output data put in the order pursuant to the frequency offset compensation amount and then inputting the output data to the second FFT means.

The frequency offset compensation method of the present invention is a frequency offset compensation method that includes a first FFT step of performing a discrete-time Fourier transform of an input signal, a second FFT step performing a discrete-time Fourier transform, and an offset compensation step of changing an order of output data provided in the first FFT step according to a frequency offset compensation amount, rearranging the output data put in the order pursuant to the frequency offset compensation amount, and then inputting the output data to the second FFT means.

Advantageous Effects of Invention

According to the present invention, it is possible to realize a frequency offset compensation apparatus and a frequency offset compensation method in which frequency offset compensation is performed without needing a new complex multiplier or a new memory.

DESCRIPTION OF EMBODIMENTS

Hereinafter, best modes of the present invention will be described with reference to the drawings. However, although the exemplary embodiments described below includes technically preferable limitations in order to carry out the present invention, it is not intended to limit the scope of the invention to what are described below.

First Exemplary Embodiment

A first exemplary embodiment of the present invention will be described with reference to FIG. 1. A frequency offset compensation apparatus of this exemplary embodiment includes first FFT means 101 for performing a discrete-time Fourier transform of input signals and second FFT means 105 for performing a discrete-time Fourier transform. Furthermore, the frequency offset compensation apparatus includes offset compensation means 110 for changing the order of output data of the first FFT means 101 according to a frequency offset compensation amount 109, rearranging the output data put in an order pursuant to the frequency offset compensation amount 109, and then inputting the output data to the second FFT means 105.

According to this exemplary embodiment, it is possible to realize a frequency offset compensation apparatus that performs frequency offset compensation without needing a new complex multiplier or a new memory.

Second Exemplary Embodiment

Figure 1:
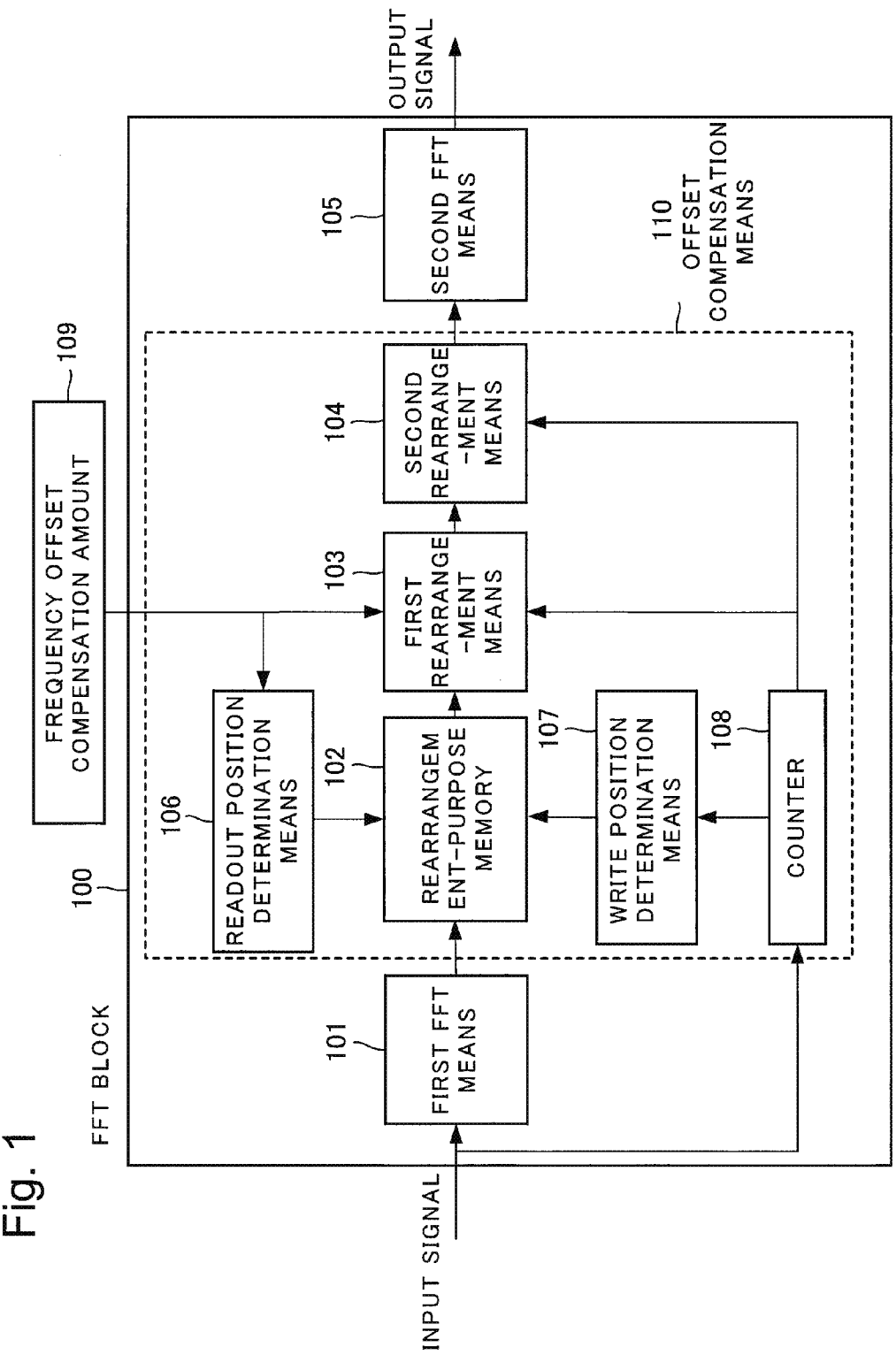
FIG. 1 is a block diagram illustrating a construction of first and second exemplary embodiments of the present invention.
Figure 2:
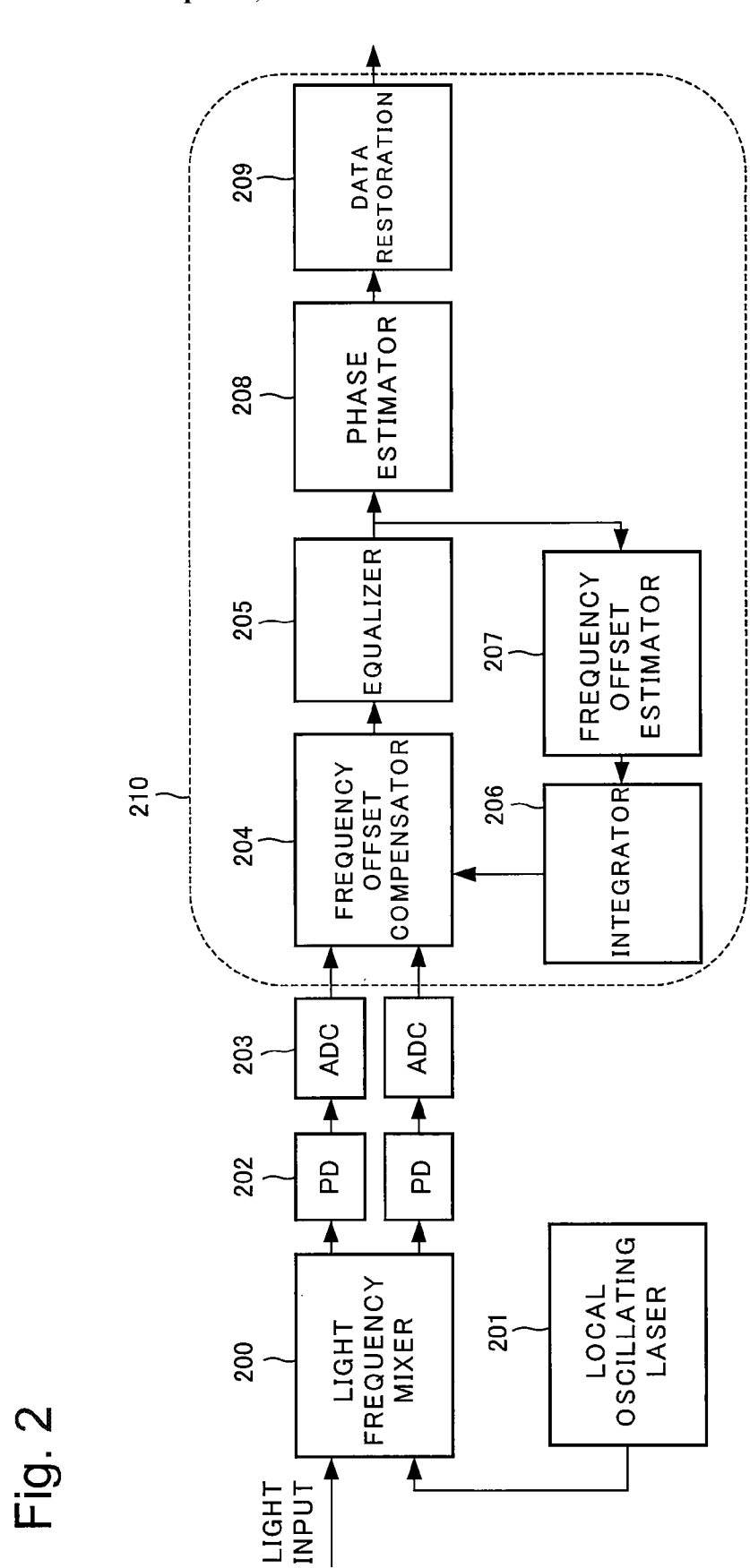
FIG. 2 is a construction example of an optical digital coherent receiver based on digital signal processing.

FIG. 1 is a block diagram illustrating a construction of a frequency offset compensation apparatus in a second exemplary embodiment of the present invention. An FFT block 100 that forms the frequency offset compensation apparatus of this exemplary embodiment includes first FFT means 101 for performing a discrete-time Fourier transform of input signals and second FFT means 105 for performing a discrete-time Fourier transform. Furthermore, the FFT block 100 includes offset compensation means 110 for changing the order of output data of the first FFT means 101 according to a frequency offset compensation amount 109, rearranging the output data put in the order pursuant to the frequency offset compensation amount 109, and then inputting the output data to the second FFT means 105.

The offset compensation means 110 includes a counter 108 that counts the order of input data. Furthermore, the offset compensation means 110 includes a rearrangement-purpose memory 102 for appropriately inputting output results of the first FFT means 101 into the second FFT means 105. Furthermore, the offset compensation means 110 includes write position determination means 107 for determining a write position in the rearrangement-purpose memory 102 based on the value of the counter 108, and readout position determination means 106 for changing a reading-out order for the rearrangement-purpose memory 102 based on the frequency offset compensation amount 109. Furthermore, the offset compensation means 110 includes first rearrangement means 103 for rearranging the output of the rearrangement-purpose memory 102 based on the value of the counter 108 and the frequency offset compensation amount 109. Furthermore, the offset compensation means 110 includes second rearrangement means 104 for, based on the value of the counter 108, rearranging readout results from the first rearrangement means 103 and making data to be input to the second FFT means 105.

In short, the offset compensation means 110 includes the rearrangement-purpose memory 102, the counter 108, the write position determination means 107, the readout position determination means 106, the first rearrangement means 103, and the second rearrangement means 104. Then, the frequency offset compensation apparatus includes the first FFT means 101, the second FFT means 105, and the offset compensation means 110 present between the first FFT means 101 and the second FFT means 105.

Figure 9:
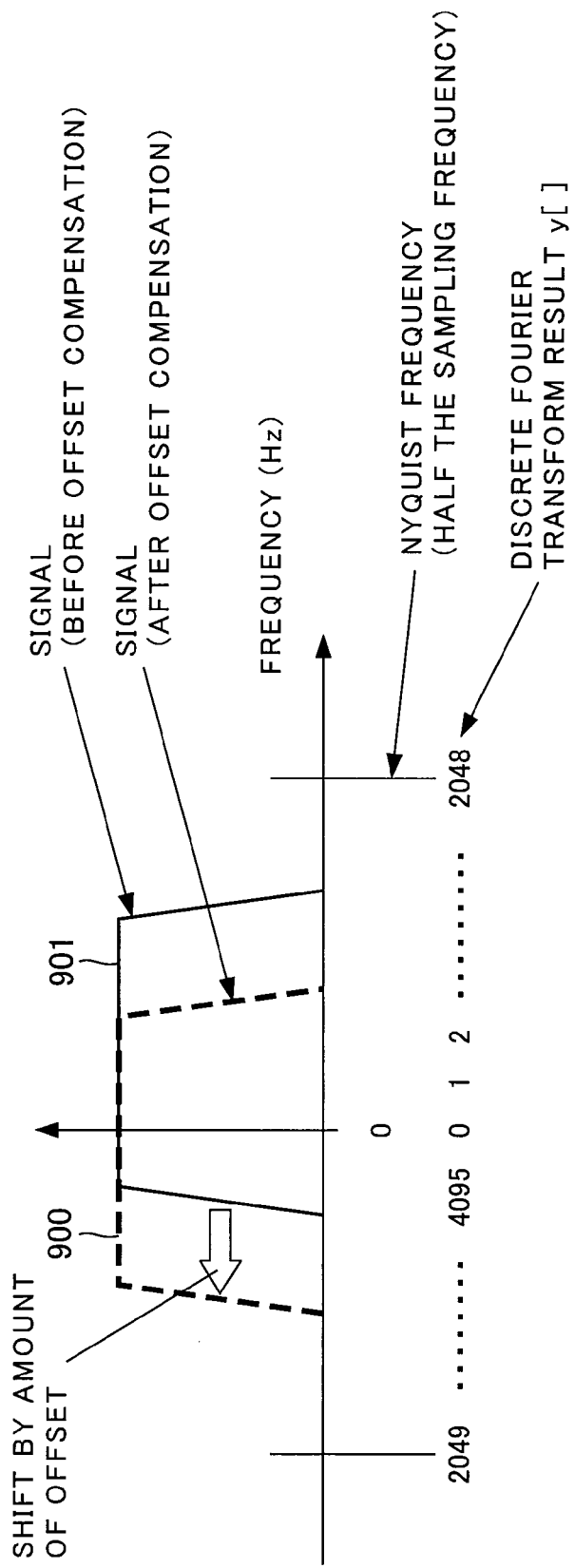
FIG. 9 is a diagram illustrating a principle of a frequency offset compensation.

Before describing the operations of this exemplary embodiment, a principle in how the frequency offset compensation is performed will be described in detail. As stated above in Background Art, when the frequency offset compensation is performed in frequency domain, the frequency offset compensation is realized by, as illustrated in FIG. 9, shifting a signal (prior to offset compensation) 901 to the left or to the right by an amount by which offset is made. Therefore, assuming that a signal y is a result of the FFT, it suffices that in the case of a shift by p to the left, y[(n−p)%4096](% indicates the remainder when n−p is divided by 4096) is calculated, and that in the case of a shift by p to the right, y[(n+p)%4096] is calculated. In other words, it suffices that in the case of a shift by 1 to the right, an FFT result of y[4095] is handled as y[0], y[0] as y[1], y[1] as y[2], and so on.

Figure 6:
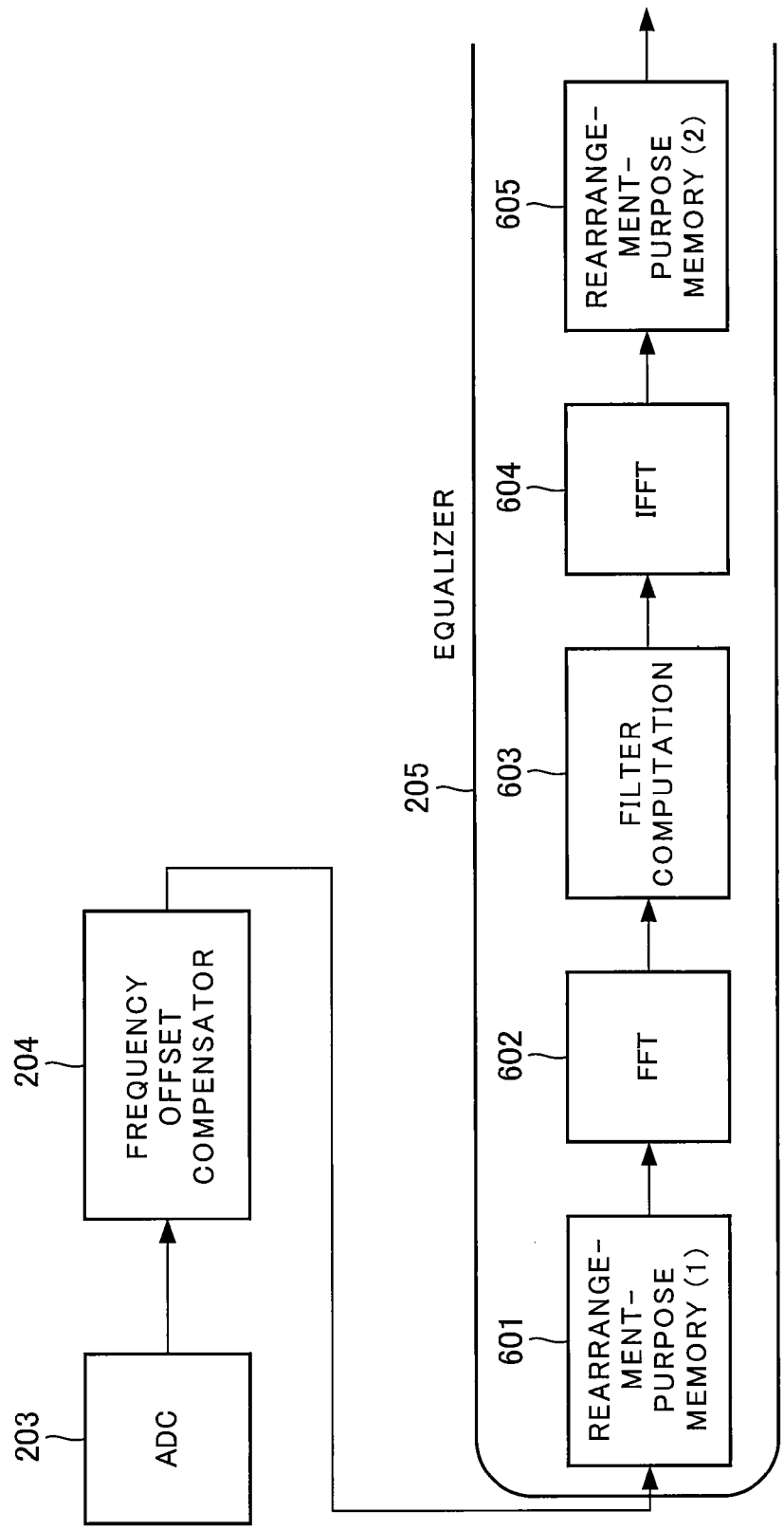
FIG. 6 is a block diagram in which a flow of a process from the ADC is exhibited.
Figure 10:
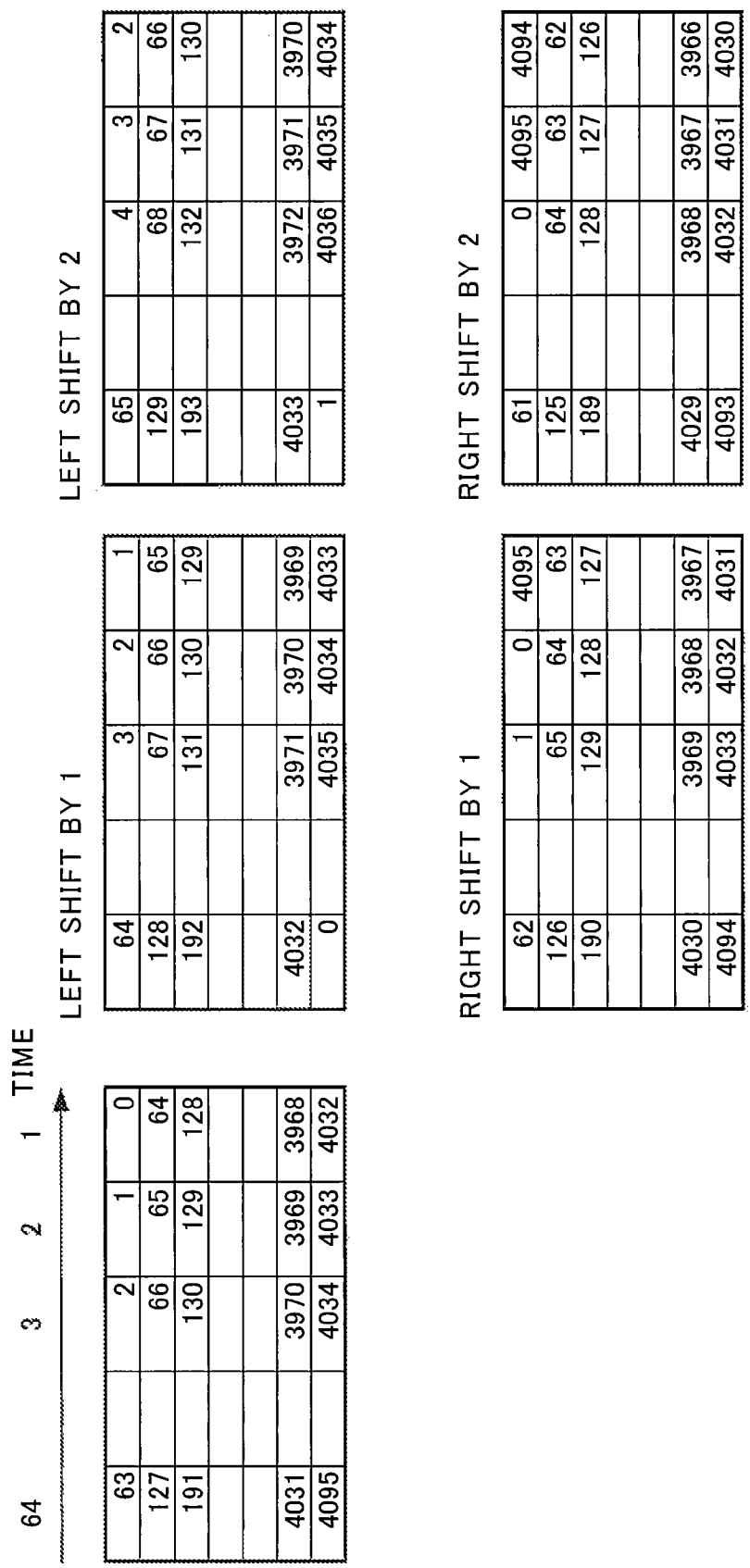
FIG. 10 is a diagram in which output orders of an FFT are presented with respect to various frequency offset compensation amounts.

Therefore, in the cases of a left shift by 1, a left shift by 2, a right shift by 1, and a right shift by 2, it suffices that outputs are produced as illustrated in FIG. 10. The following description will be made by taking as an example the case of a left shift by 1. Originally, y[0], y[64], . . . y[4032] are output in the 1st cycle, and y[1], y[65], . . . y[4033] are output in the 2nd cycle, and these outputs are propagated to a subsequent-stage process block (e.g., a filter computation 603 in FIG. 6). Instead of this, y[1], y[65], . . . y[4033] are output in the 1st cycle, and y[2], y[66], . . . y[4034] are output in the 2nd cycle, and y[64], . . . y[4032], y[0] are output in the 64th cycle. Accordingly, the subsequent-stage process block processes y[1], y[65], . . . y[4033] as y[0], y[64], . . . y[4032]. Thus, an operation comparable to that performed when a left shift by 1 is made can be achieved.

Figure 3:
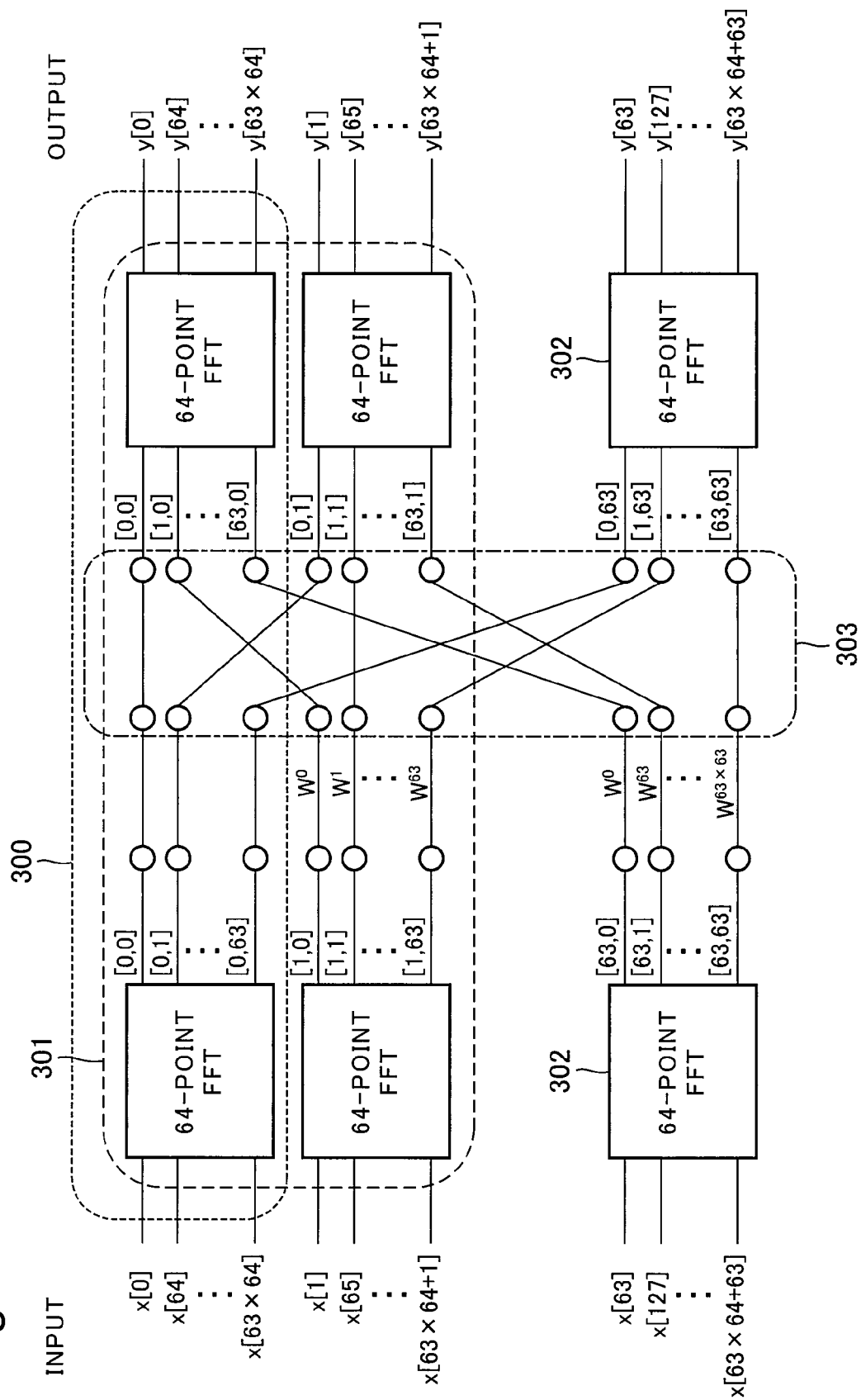
FIG. 3 is a circuit that performs a 4096-point FFT/IFFT that uses a Prime Factor method.
Figure 4:
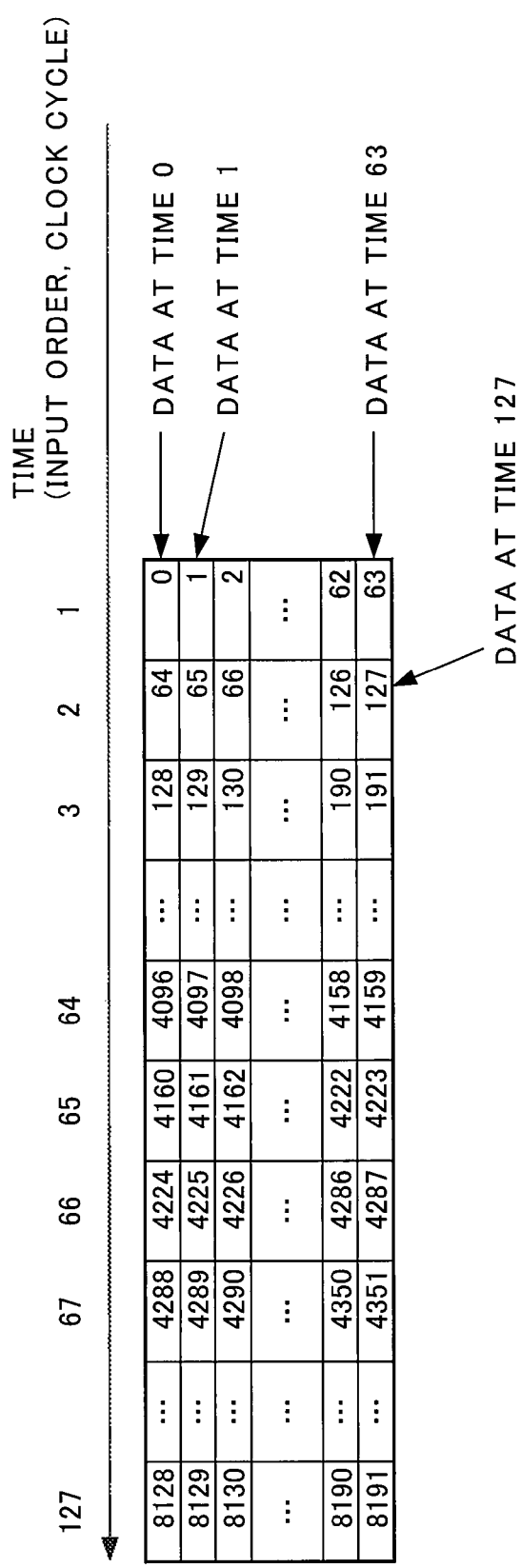
FIG. 4 is an example of 64-parallel output data from an ADC.
Figure 5:
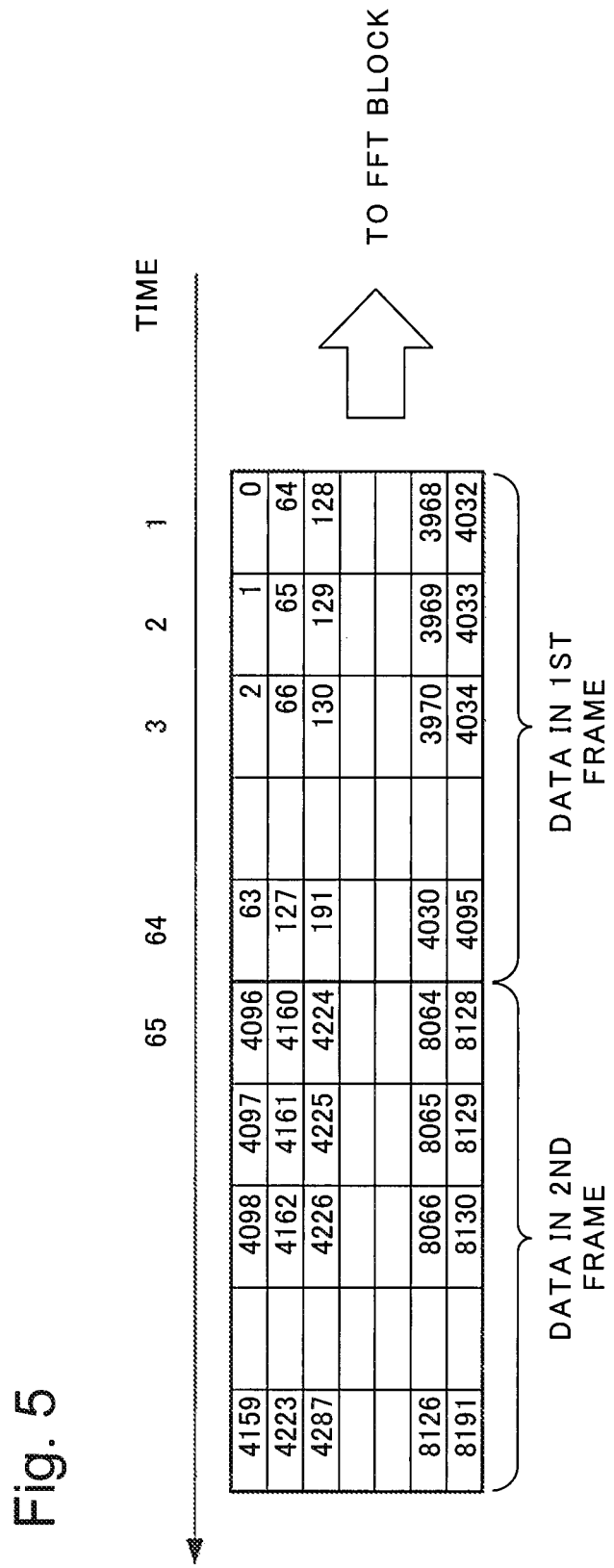
FIG. 5 is a data string that is input to an FFT block.

In this exemplary embodiment, this is realized by changing the order of input to FFTs on the right side in FIG. 3. FIG. 10 is a table focusing on outputs of an FFT. A table in which the outputs illustrated in FIG. 10 have been transformed into inputs to the FFTs on the right side in FIG. 3 is presented in FIG. 11. In this exemplary embodiment, the frequency offset compensation is realized by setting the order of input to the FFTs on the right side in FIG. 3 as presented in FIG. 11.

Next, an operation of each means will be described in detail.

The first FFT means 101 and the second FFT means 105 are means for separately performing the FFT on input data and outputting the results of the FFT. The realizing method for the FFT may be a typical method of Cooley-Tukey (NPL 2) or may also be a method in which a discrete-time Fourier transform is theoretically calculated. When the first FFT means 101 and the second FFT means 105 are considered in correspondence to FIG. 3, the first FFT means 101 refers to a 64-point FFT 302 on the left side, and the second FFT means refers to a 64-point FFT 302 on the right side.

Figure 7:
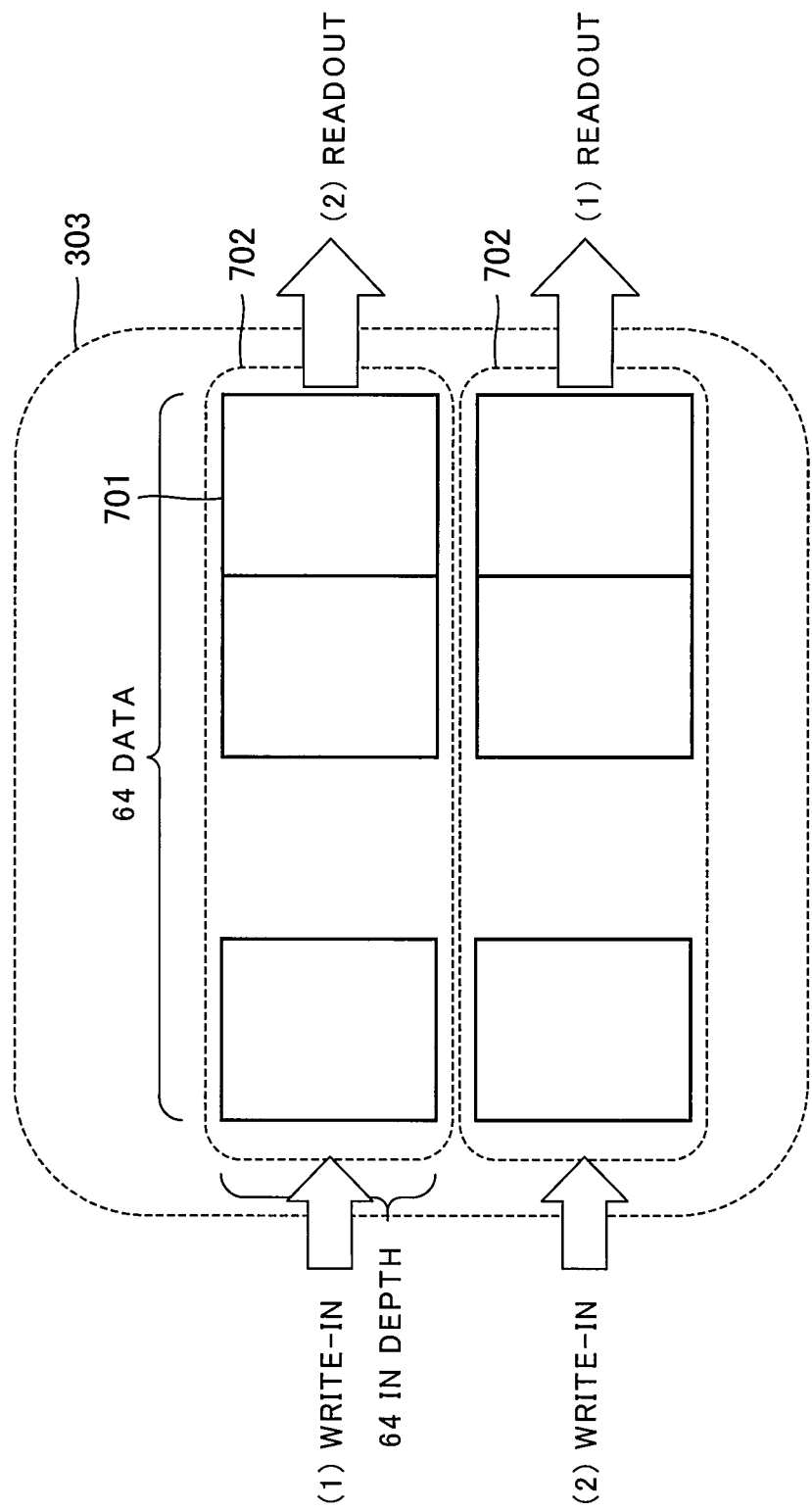
FIG. 7 is a diagram illustrating write positions to a rearrangement-purpose memory present inside an FFT/IFFT.

The rearrangement-purpose memory 102 is a memory (rearrangement-purpose memory 303) for appropriately giving and receiving data between an FFT group present on the left side in an FFT block 300 in FIG. 3 and an FFT group present on the right side. Details of that operation are as what have been described through the use of FIG. 7 and FIG. 8. An operation of the write position determination means 107, as also has been described through the use of FIG. 7, is an operation of determining the write position for the data output from the first FFT means 101 according to the value of the counter 108 as exhibited in FIG. 8. Note that in FIG. 8, the diagram on the upper side presents a table in which outputs of the FFTs on the left side in FIG. 3 are focused on (which corresponds to, for example, FIG. 10), and the diagram on the lower side presents a table in which a transformation into inputs to the FFTs on the right side in FIG. 3 has been made (which corresponds to, for example, FIG. 11).

The second rearrangement means 104 is means for rearranging values read out from the rearrangement-purpose memory 102. According to FIG. 8, for example, in the 2nd cycle, [63, 1], [0, 1], [1, 1], . . . [62, 1] are given. These values are rearranged by one to the left (hereinafter, described as rotated left by 1) into [0, 1], [1, 1], . . . [62, 1], and [63, 1], and then input to the second FFT means 105. In the 3rd cycle, [62, 2], [63, 2], [0, 2], [1, 2], . . . [61, 2] are given, and therefore these values are rotated left by 2 into [0, 2], [1, 2], . . . [62, 1], and [63, 1]. In the 64th cycle, the values are rotated left by 63 (=rotated right by 1).

A novel feature of this exemplary embodiment is that the readout position determination means 106 and the first rearrangement means 103 have been added. Hereinafter, operations of these two means will be described in detail.

Figure 8:
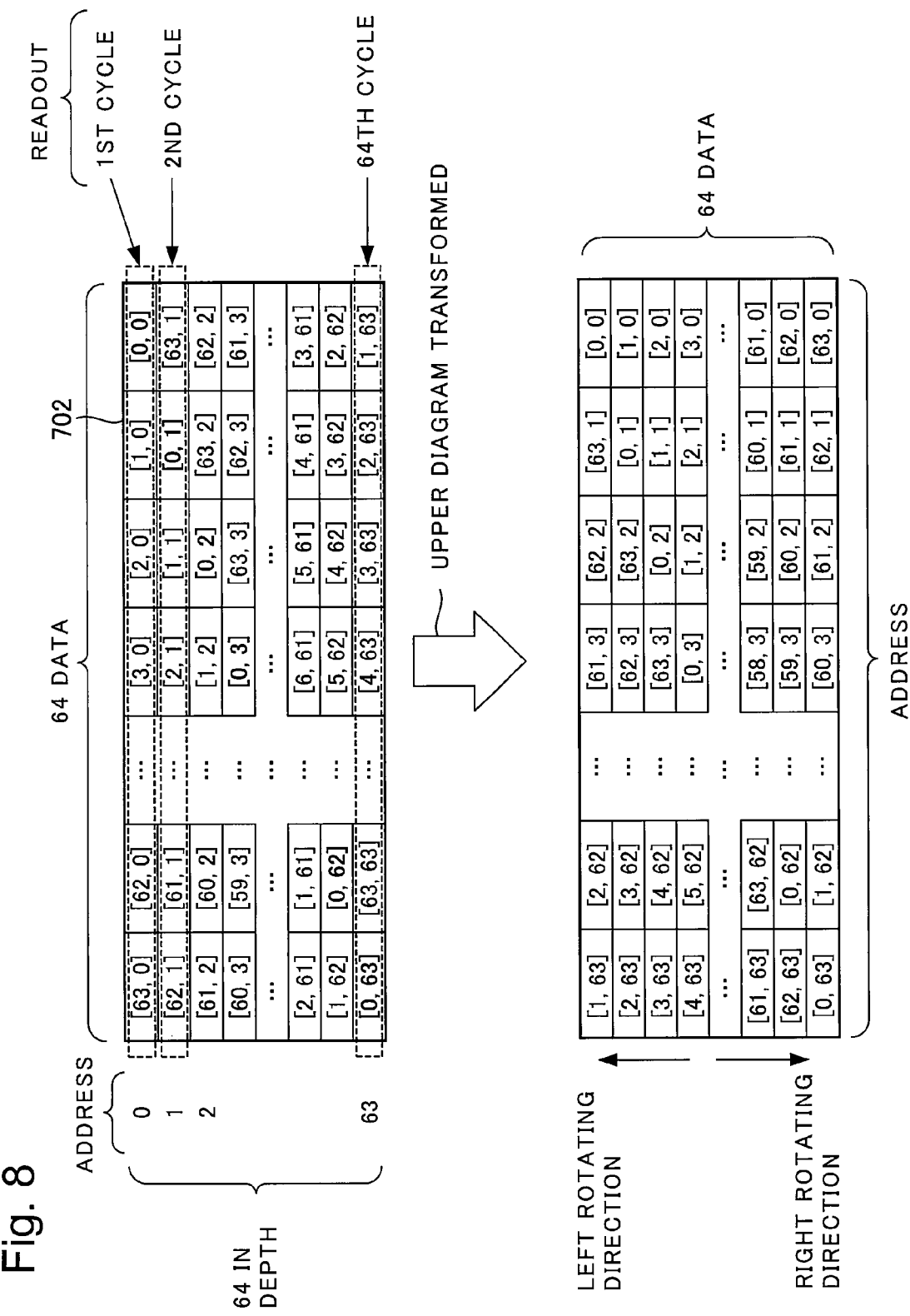
FIG. 8 is a diagram illustrating operations of an actual rearrangement-purpose memory present in an FFT/IFFT.
Figure 11:
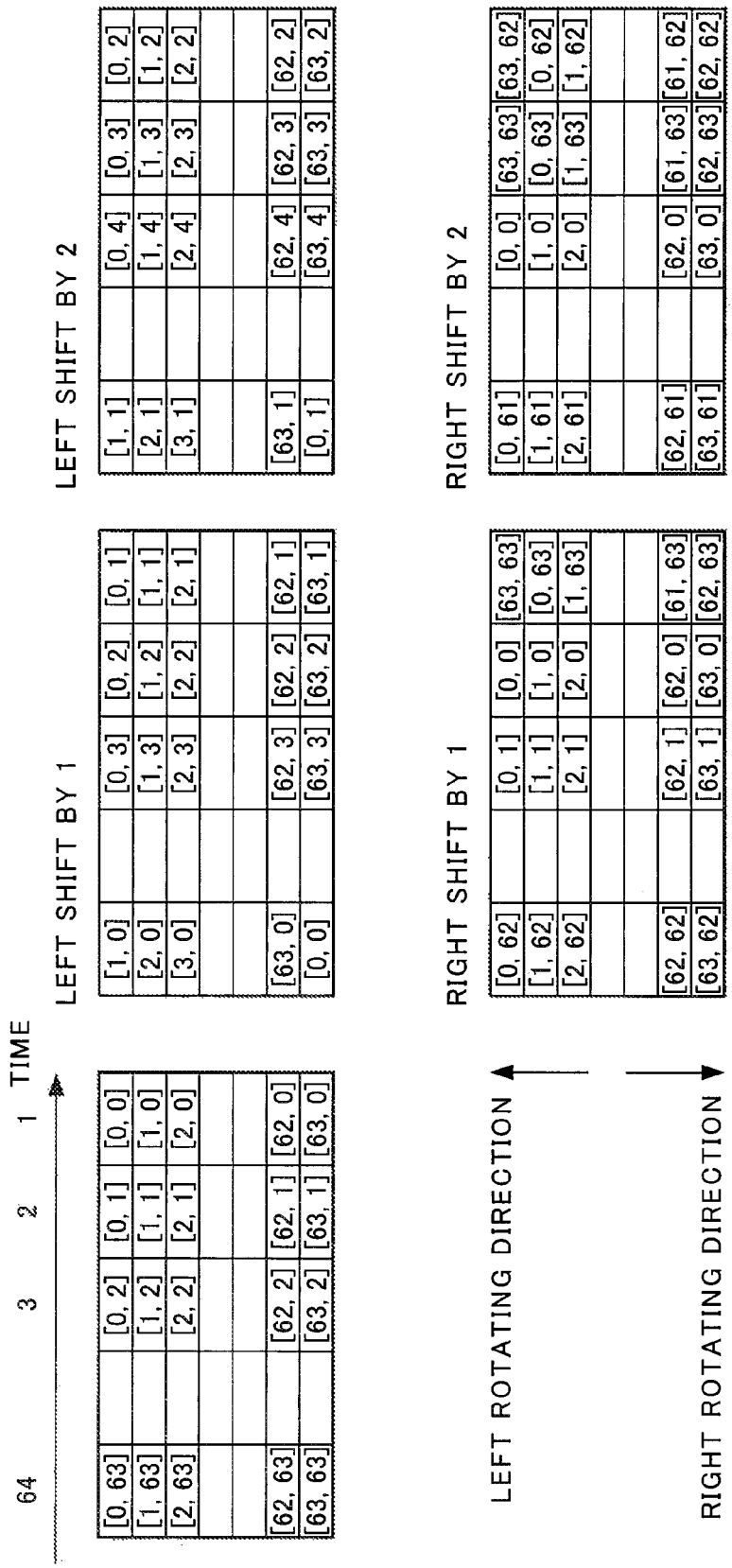
FIG. 11 is a diagram obtained by replacing the output orders of the FFT in FIG. 10 with inputs to a second FFT.

The readout position determination means 106 is means for changing the reading-out order about the rearrangement-purpose memory 102 based on the frequency offset compensation amount 109. In the case where the frequency offset compensation is not performed, the 64-cycle readout is performed in order from the uppermost address as indicated in FIG. 8. On the other hand, in the case of a shift by 1 to the left, originally input data [0, 0], [1, 0], . . . [63, 0] corresponding to y[0], y[64], . . . y[4032] should be supplied to the second FFT means 105 in the 1st cycle as indicated in FIG. 10 and FIG. 11. However, instead of this, the input data are changed to [0, 1], [1, 1], . . . [63, 1]. In other words, the readout position determination means 106 operates so that the address to read out starts at not 0 but 1. Furthermore, the readout position determination means 106 operates so that in the final 64th cycle, address 0 is read out.

Furthermore, the first rearrangement means 103, if nothing is performed in the 1st cycle, is supplied with [63, 1], [0, 1], [1, 1], . . . [62, 1] as in FIG. 8. Originally, as indicated in FIG. 11, in the 1st cycle, [0, 1], [1, 1], . . . [62, 1], [63, 1] need to be supplied, and therefore, a left rotation by 1 is performed. After that, in all of the 2nd to 63rd cycles, the data that are input data are rotated left by 1 in substantially the same manner as in the 1st cycle. However, in the case of the 64th cycle, readout is performed from the address 0 and the data read out are [0, 0], [1, 0], [2, 0], . . . [63, 0]. On the other hand, the data that need to be input to the second FFT means 105 are in a rotated-left-by-1 state, that is, [1, 0], [2, 0], . . . [63, 0], [0, 0] as in FIG. 11. As stated above, in the 64th cycle, because the second rearrangement means 104 performs a left rotation by 63 (=right rotation by 1), the first rearrangement means 103 needs to perform a left rotation by 2.

Furthermore, when the frequency offset compensation amount is a left shift by 2, readout is performed by reading out data from the addresses 2, . . . 63, 0, 1 in that order. Then, the first rearrangement means 103 performs a left rotation by 2 from the 1st till 62nd cycles, and performs a left rotation by 3 in the 63rd and 64th cycles.

Figure 12:
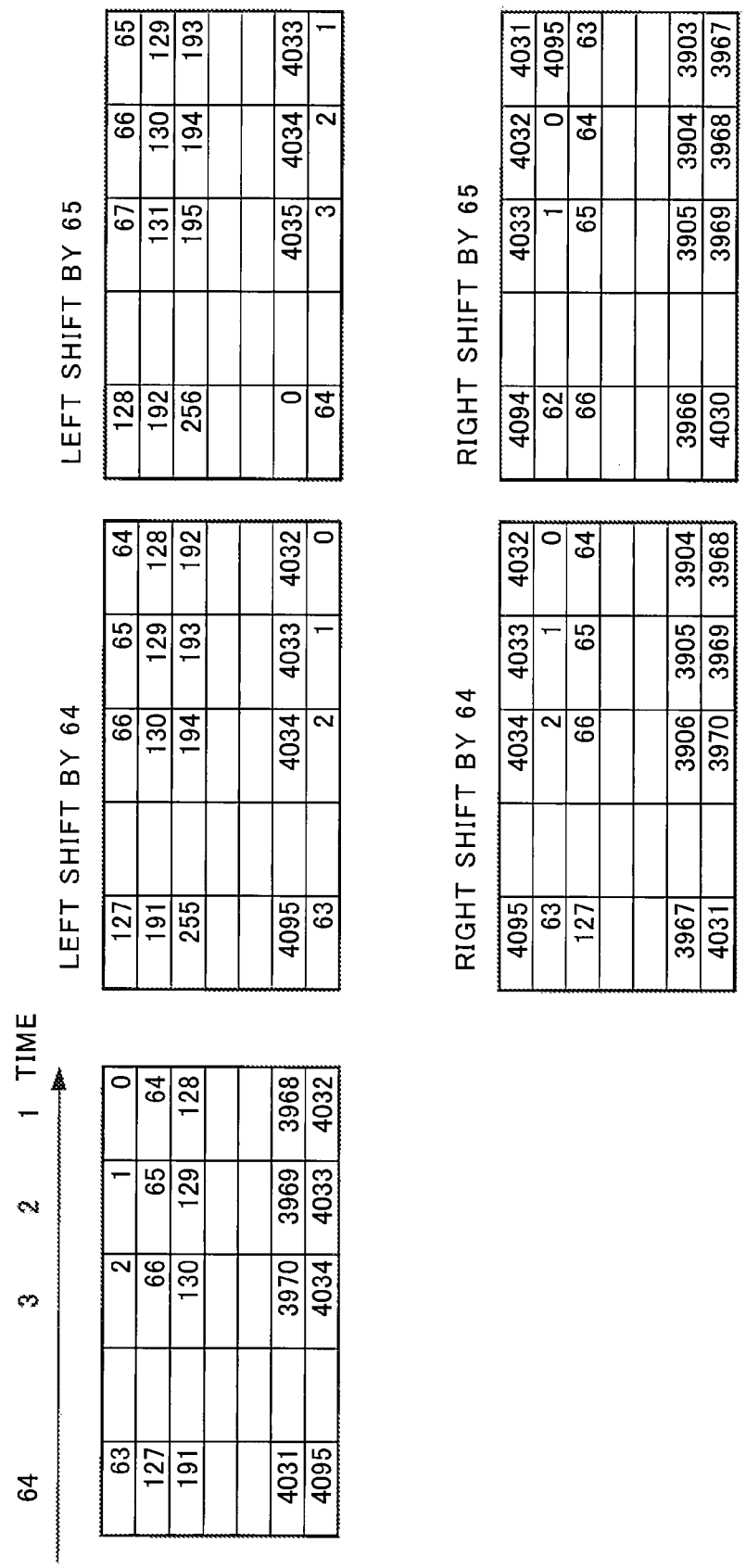
FIG. 12 is a diagram presenting the output orders of an FFT when the frequency offset compensation has been performed with respect to a left shift by 64 and a left shift by 65.
Figure 13:
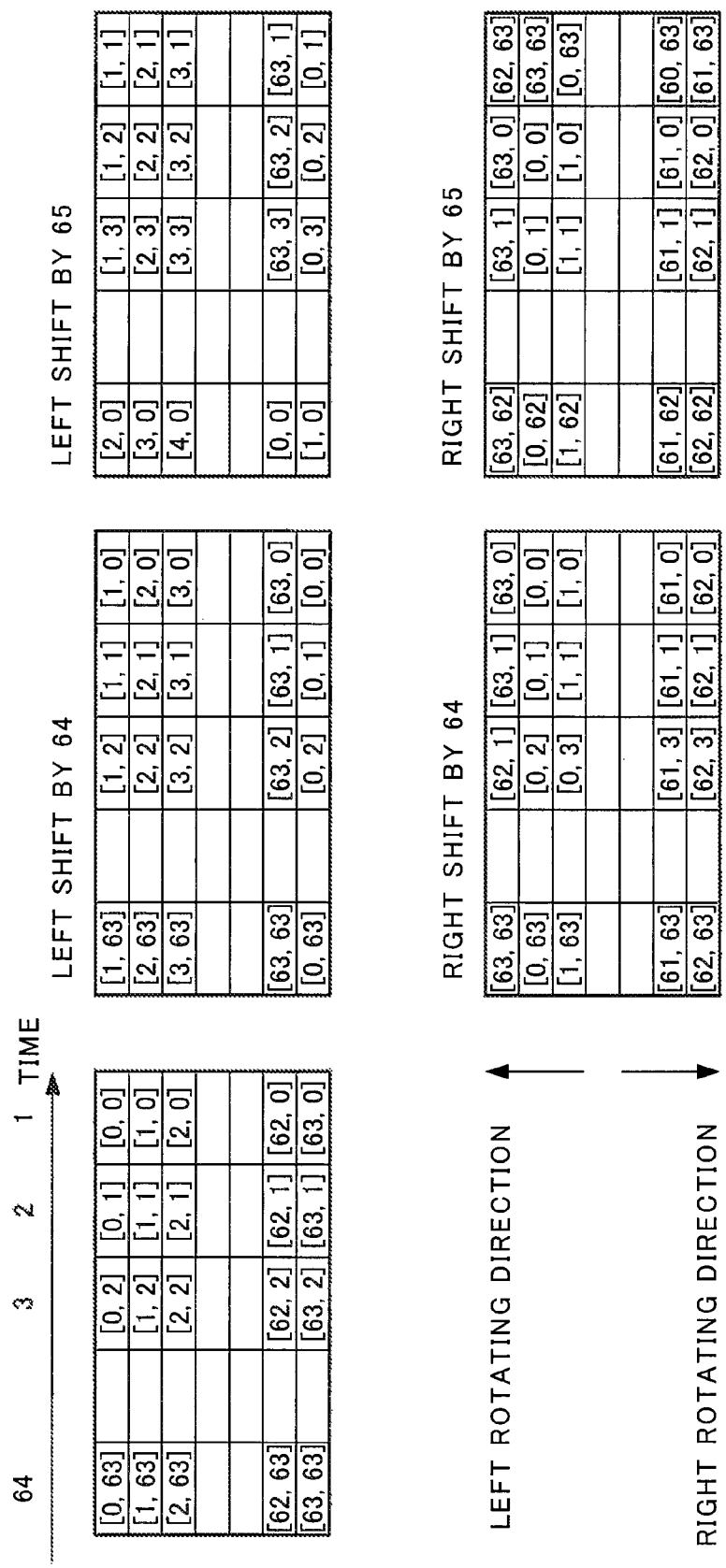
FIG. 13 is a diagram obtained by replacing the output orders of the FFT in FIG. 12 with inputs to the second FFT.

Next, the orders of output signals of the FFTs in the case of a left shift by 64 are indicated in FIG. 12. Tables in which the output signals have been transformed into inputs to the FFTs on the right side in FIG. 3 in substantially the same manner as in FIG. 11 are presented in FIG. 13. In the case of a left shift by 64, the readout position determination means 106 performs readout from the rearrangement-purpose memory 102 starting at the address 0 as in the case where the frequency offset compensation is not performed, but the first rearrangement means 103 constantly performs a left rotation by 1. Furthermore, in the case of a left shift by 65, the readout position determination means 106 performs a left rotation by 2 in the 1st to 63rd cycles, and a left rotation by 3 in the 64th cycle.

On the other hand, operations of the readout position determination means 106 and the first rearrangement means 103 in the case of a right shift will be described.

When a right shift by 1 is performed, as indicated in FIG. 11, it is necessary to perform readout from the addresses [63, 63], [0, 63][1, 63], [2, 63], . . . [62, 63] in the 1st cycle. Therefore, the readout position determination means 106 performs readout from the addresses 63, 0, 1, . . . 62 in that order. On the other hand, the second rearrangement means 104 does nothing in the 1st cycle, so that the first rearrangement means 103 operates so as to perform a right rotation by 2. In the 2nd cycle, [0, 0], [1, 0], . . . [63, 0] are read out from the rearrangement-purpose memory 102, and should be directly input to the second FFT means 105; however, since the second rearrangement means 104 performs a left rotation by 1, the first rearrangement means 103 performs a right rotation by 1.

Likewise, when a right shift by 2 is performed, the readout position determination means 106 reads out data from the addresses 62, 63, 0, 1, . . . 61 in that order, and the first rearrangement means 103 performs a right rotation by 3 in the 1st and 2nd cycles and a right rotation by 2 in the 3 to 64 cycles.

Furthermore, in the case of a right shift by 64, the readout position determination means 106 reads out data from the addresses 0, 1, . . . 62, and 63 in that order, and the first rearrangement means 103 performs a right rotation by 1 in all the cycles. In the case of a right shift by 65, it suffices that the readout position determination means 106 performs readout from the addresses 63, 0, 1, . . . 62 in that order, and performs a right rotation by 3 in the 1st cycle and a right rotation by 2 in the 2nd to 64th cycles.

Although in conjunction with this exemplary embodiment, the first rearrangement means 103 and the second rearrangement means 104 have been separately mentioned in order to clearly describe the effects thereof, the first rearrangement means 103 and the second rearrangement means 104 may be integrated as single rearrangement means that operates so as to rearrange outputs of the rearrangement-purpose memory 102 based on the value of the counter and the frequency offset amount.

Next, with regard to overall operations of this exemplary embodiment, descriptions, while centering on the rearrangement-purpose memory 102, will be made regarding the case of a left shift by 1.

Figure 14:
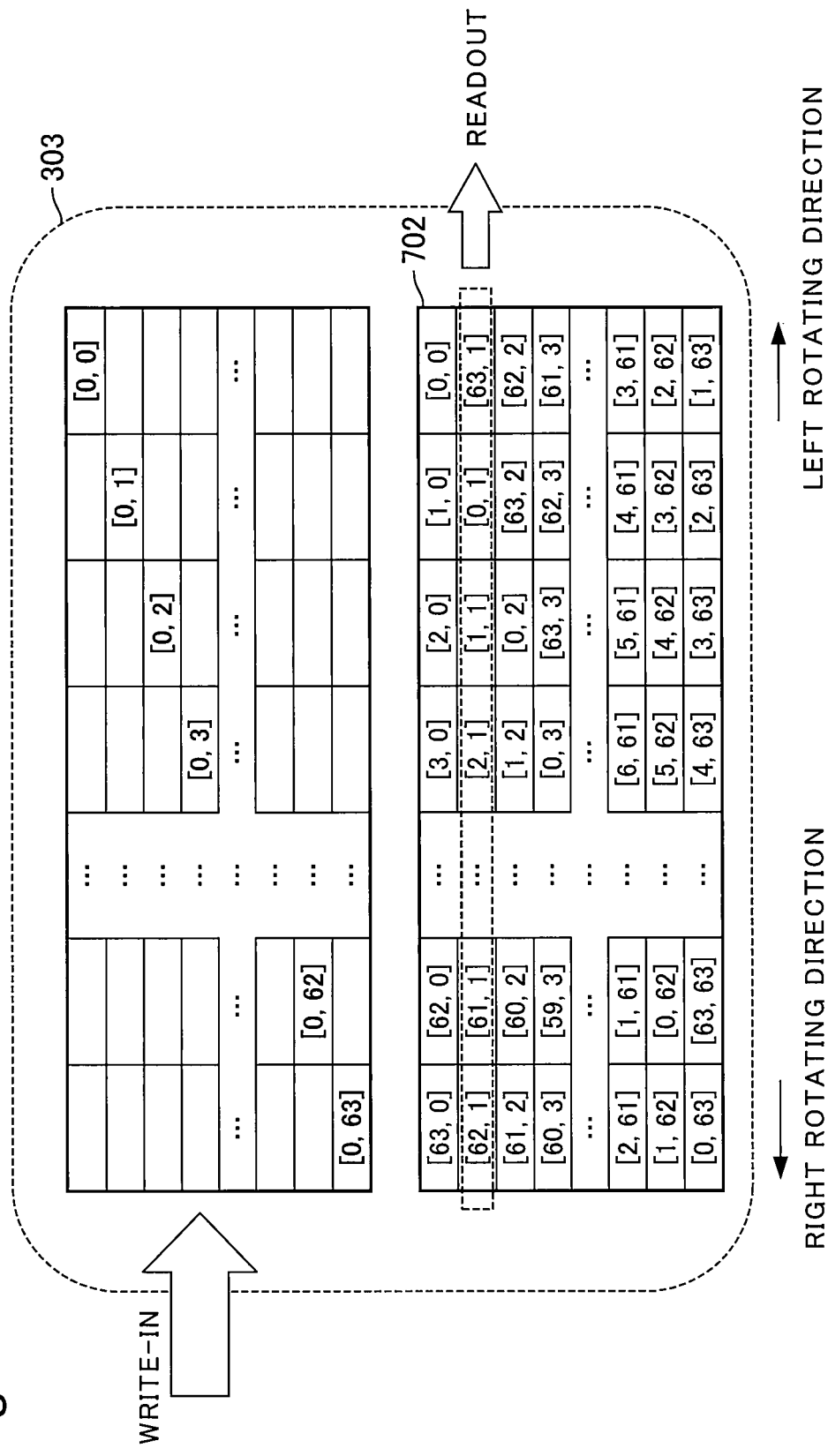
FIG. 14 is a diagram indicating values of the rearrangement-purpose memory in the 1st provision (1st clock cycle) at the time of a left shift by 1.

First, in the 1st cycle, the rearrangement-purpose memory 102 changes as in FIG. 14. With regard to a memory on a writing side in the rearrangement-purpose memory 102, results of the FFT are written in at positions on a diagonal line where entries have been given in boldface. Simultaneously, the address 1 in a memory on a readout side is read out. After that, the results are rearranged by the first rearrangement means 103, and then supplied to the second FFT means 105. Then, the FFT results of the second FFT means 105 are y[0], y[64], . . . y[63×64] as in FIG. 3. As stated above, in the 1st cycle, the second rearrangement means 104 does not do anything, and the first rearrangement means 103 performs a left rotation by 1.

Figure 15:
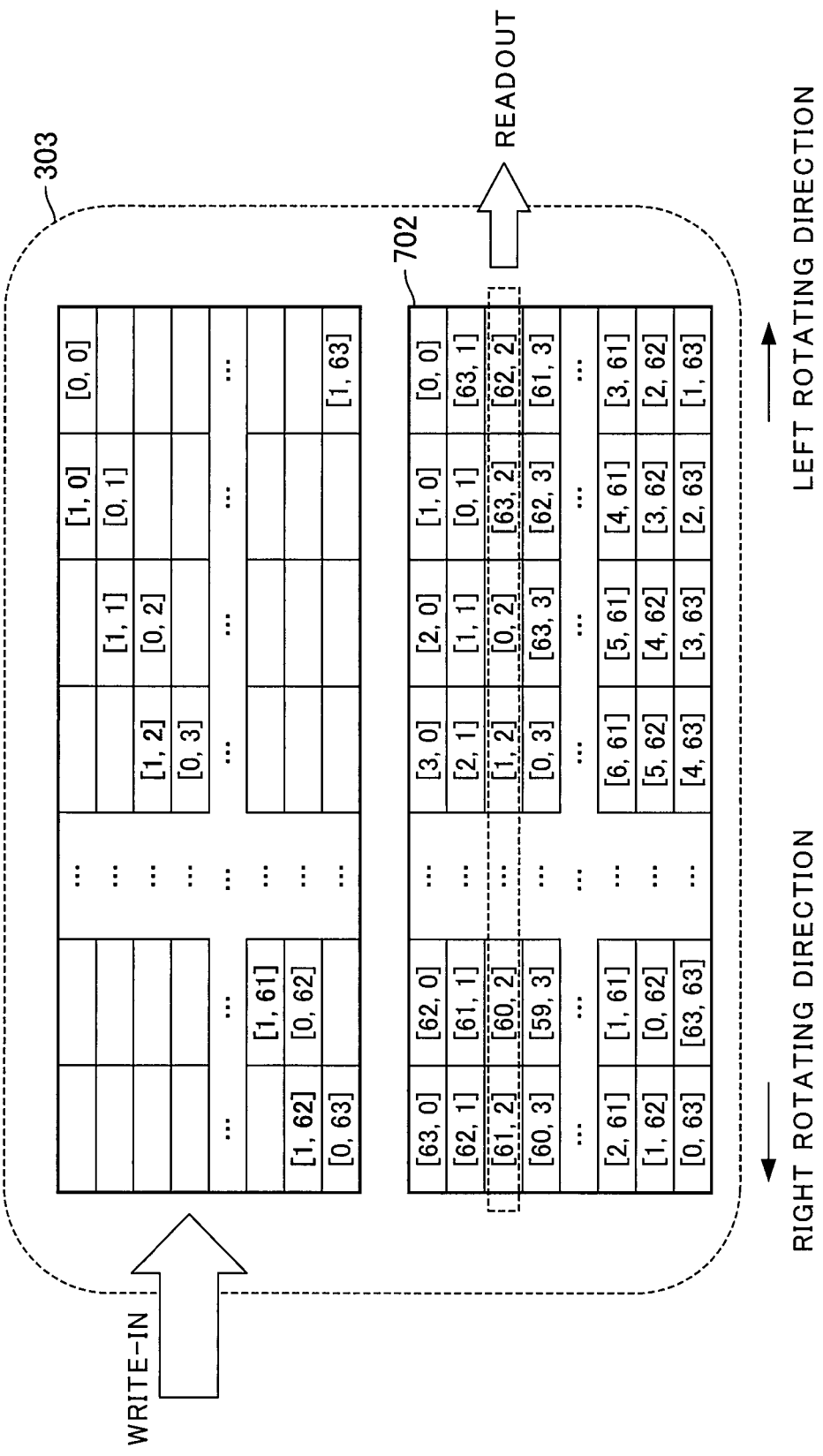
FIG. 15 is a diagram indicating values of the rearrangement-purpose memory in the 2nd provision (2nd clock cycle) at the time of a left shift by 1.

Then, in the 2nd cycle, the rearrangement-purpose memory 102 changes as in FIG. 15. Results of the FFT are written into the memory on the writing side in the rearrangement-purpose memory 102, at positions where the entries in boldface have been given; simultaneously, the address 2 of the memory on the readout side is read out. As stated above, in the 2nd cycle, the second rearrangement means 104 performs a left rotation by 1, and the first rearrangement means 103 also performs a left rotation by 1. Then, results are supplied to the second FFT means 105. Then, results of the second FFT means 105 are y[1], y[65], . . . y[63×64+1] as in FIG. 3.

Figure 16:
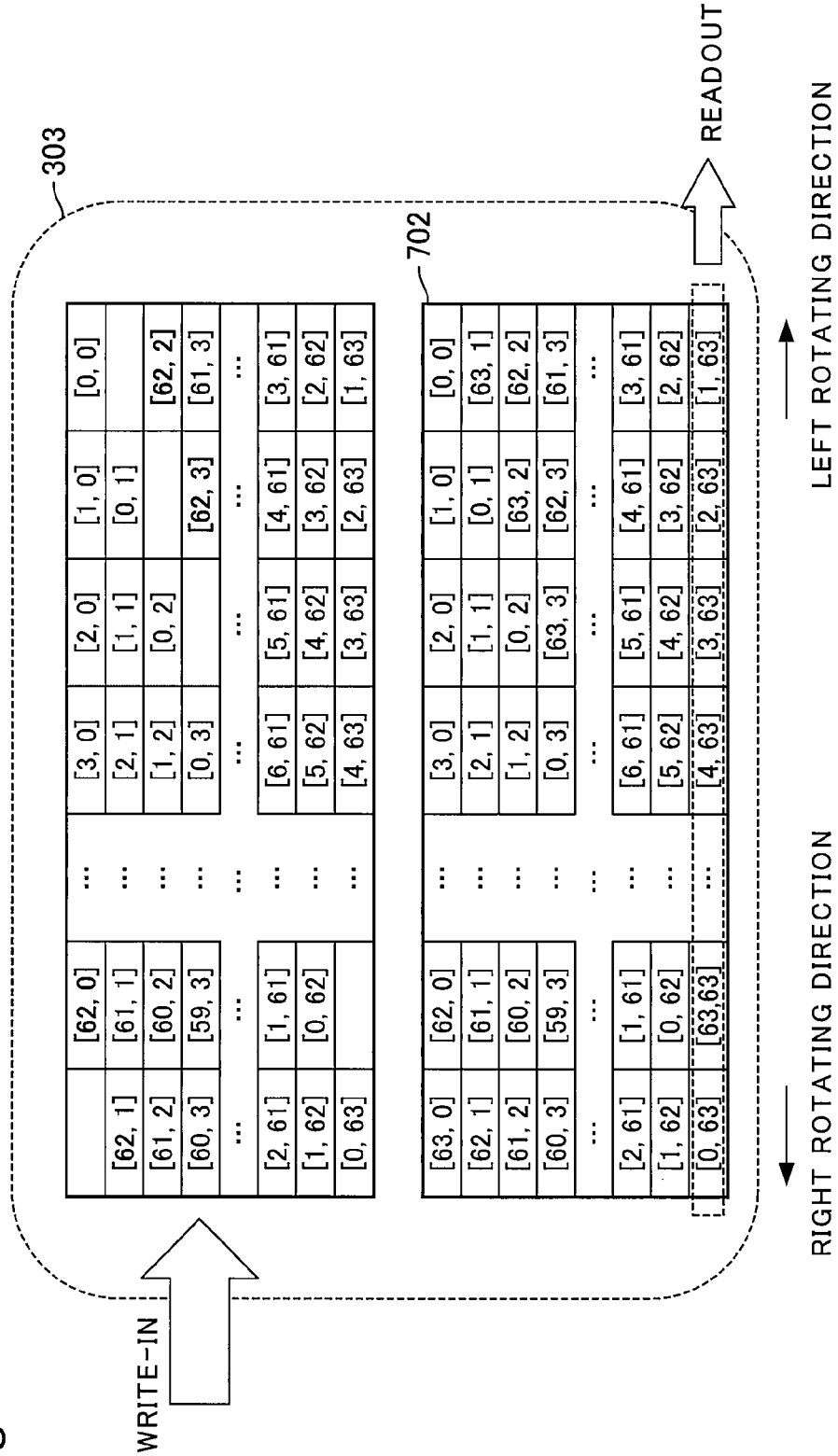
FIG. 16 is a diagram indicating values of the rearrangement-purpose memory in the 63rd provision (63rd clock cycle) at the time of a left shift by 1.

The operation as described above continues from the 3 cycle till 63 cycle. FIG. 16 illustrates the operation in the 63rd cycle.

Figure 17:
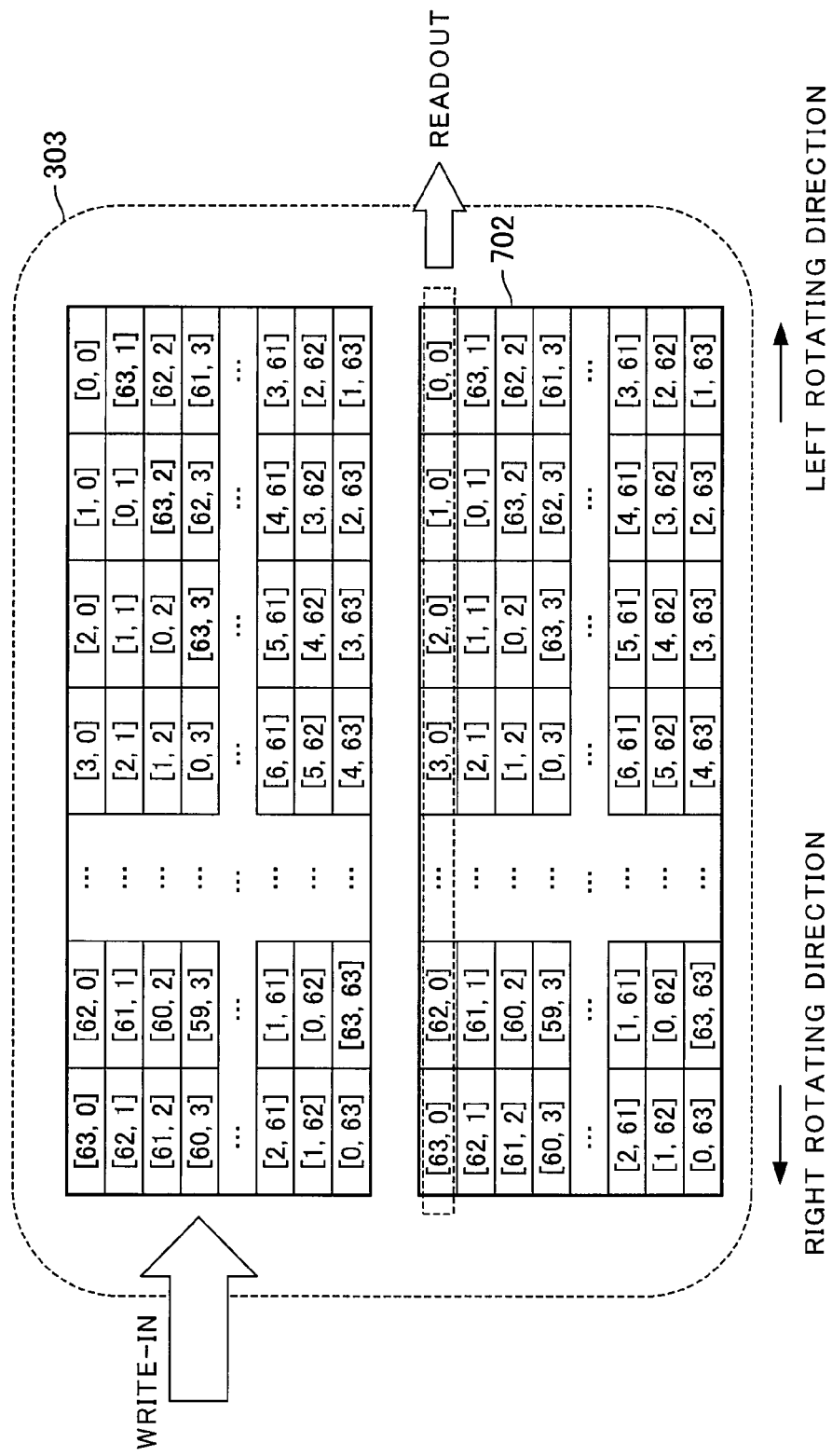
FIG. 17 is a diagram indicating values of the rearrangement-purpose memory in the 64th provision (64th clock cycle) at the time of a left shift by 1.

Next, in the 64th cycle, the rearrangement-purpose memory changes as in FIG. 17. With regard to the memory on the writing side in the rearrangement-purpose memory 102, results of the FFT are written in at positions where entries have been given in boldface; simultaneously, the address 0 of the memory on the readout side is read out. As stated above, the FFT results are rotated left by 2 by the first rearrangement means 103, rotated left by 63 by the second rearrangement means (rotated left by 1 in combination), and then supplied to the second FFT means 105. Then, the results of the second FFT are y[63], y[64], . . . y[63×64+63] as in FIG. 3.

Figure 18:
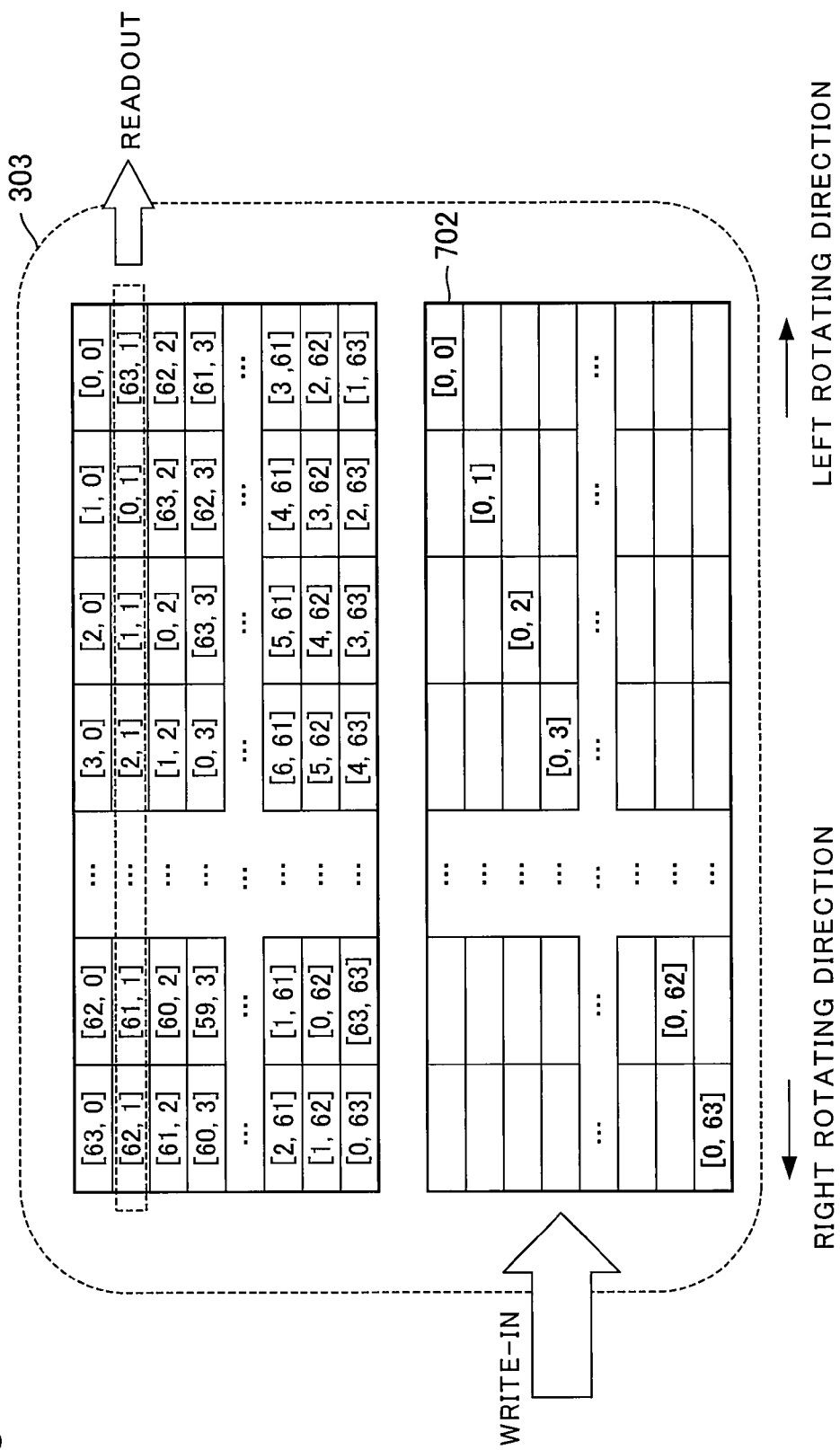
FIG. 18 is a diagram indicating values of the rearrangement-purpose memory in the 65th provision (65th clock cycle) at the time of a left shift by 1.

Next, in the 65th cycle, the rearrangement-purpose memory changes as in FIG. 18. At this time, while the positions in the memory in which to write and the memory from which to read out are reversed, the other operations are the same as in the 1st cycle.

Furthermore, the addresses at which writing is made in the memory and the addresses from which readout is made are an example, and are not meant to be limited to the example. Likewise, the numbers of rotations to the right and left are not meant to be limited by the example.

As above, in this exemplary embodiment, the reading-out order about the rearrangement-purpose memory 102 provided in the FFT block 100 is changed according to the frequency offset compensation amount 109. Furthermore, there is also provided the first rearrangement means 103 for appropriately rearranging the data read out from the rearrangement-purpose memory according to the frequency offset compensation amount 109. Accordingly, there is no need to provide a new memory for carrying out the frequency offset compensation in frequency domain, and it becomes possible to perform the frequency offset compensation. On the other hand, in this exemplary embodiment, although the readout position determination means 106 and the first rearrangement means 103 are needed, the provision of these means is predominantly minor as compared with provision of a new memory.

Third Exemplary Embodiment

A third exemplary embodiment of the present invention will be described with reference to the drawings. Although in the second exemplary embodiment, the frequency offset compensation is realized by rearranging needed data by changing the order in which data are read out from a memory according to the amount of compensation, the frequency offset compensation is realized instead by changing the order in which data are written in in this exemplary embodiment.

Figure 19:
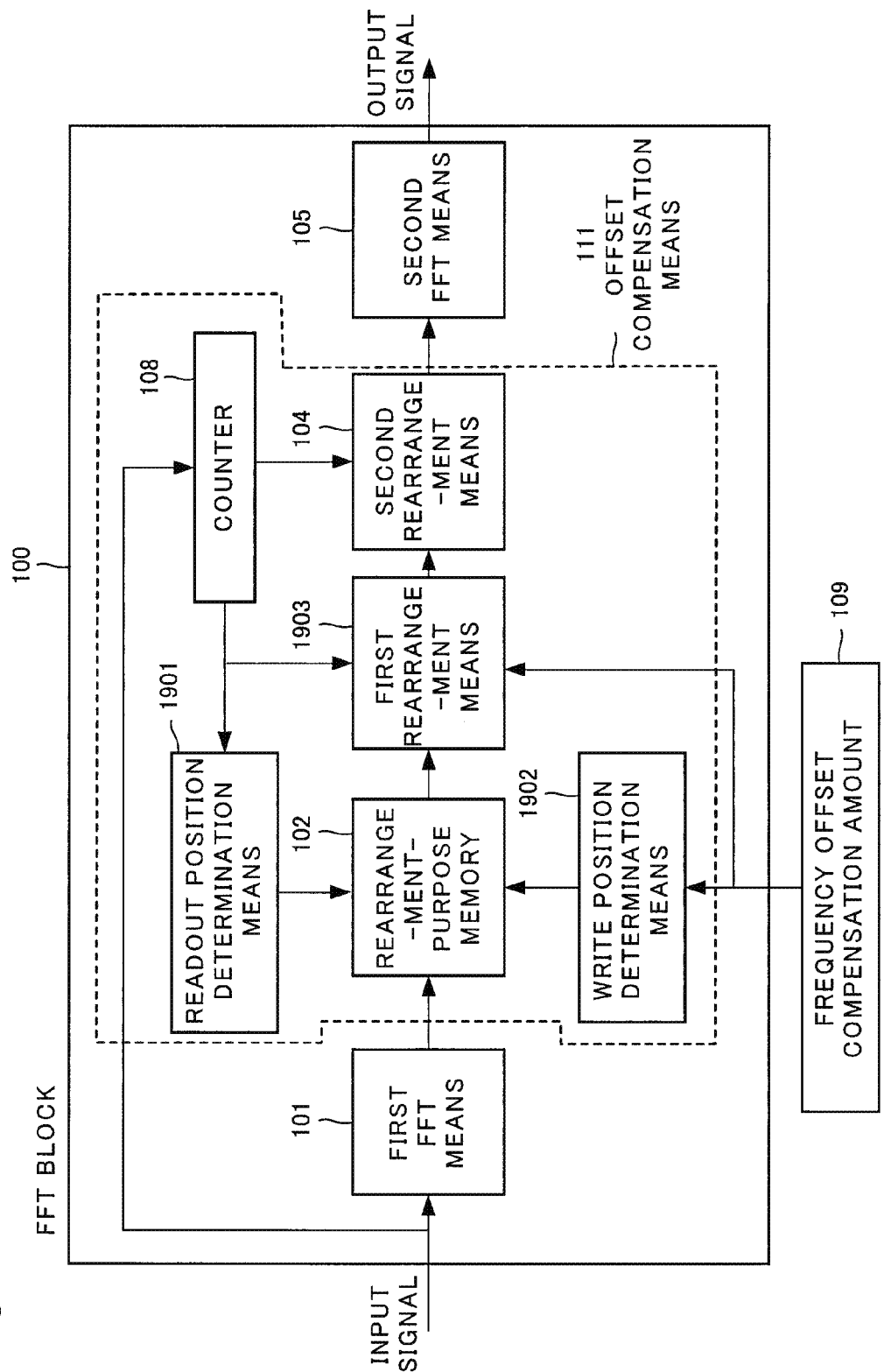
FIG. 19 is a block diagram illustrating a construction of a third exemplary embodiment of the present invention.

FIG. 19 is a block diagram illustrating a construction of a frequency offset compensation apparatus of this embodiment. This exemplary embodiment includes, in an FFT block 100 that performs a discrete-time Fourier transform which forms a frequency offset compensation apparatus, first FFT means 101 for performing a small FFT, second FFT means 105, and a counter 108 that counts the order of input data. Furthermore, the exemplary embodiment includes a rearrangement-purpose memory 102 for appropriately inputting output results of the first FFT means 101 into the second FFT means 105, the rearrangement-purpose memory 102 being between the first FFT means 101 and the second FFT means 105.

Furthermore, the exemplary embodiment includes readout position determination means 1901 for determining a readout position with regard to the rearrangement-purpose memory 102 on the basis of the value of the counter 108. Furthermore, the exemplary embodiment includes write position determination means 1902 for determining a position at which writing into the rearrangement-purpose memory 102 is made, based on the value of the counter 108 and the frequency offset amount. Furthermore, the exemplary embodiment includes first rearrangement means 1903 for rearranging outputs of the rearrangement-purpose memory 102 based on the counter 108 and a frequency offset compensation amount 109. Furthermore, the exemplary embodiment includes second rearrangement means 104 for rearranging data output from the first rearrangement means 1903 based on the value of the counter 108.

In other words, offset compensation means 111 includes the rearrangement-purpose memory 102, the counter 108, the write position determination means 1902, the readout position determination means 1901, the first rearrangement means 1903, and the second rearrangement means 104. Then, the frequency offset compensation apparatus includes the first FFT means 101, the second FFT means 105, and the offset compensation means 111 present between the first FFT means 101 and the second FFT means 105.

The first FFT means 101, the second FFT means 105, the counter 108, the rearrangement-purpose memory 102, and the second rearrangement means 104 perform the same operations as in the second exemplary embodiment. Novel features provided in the exemplary embodiment in order to perform the frequency offset compensation are the write position determination means 1902 for determining the position at which the results of the first FFT means 101 are written into the rearrangement-purpose memory 102 based on the frequency offset compensation amount 109, and the first rearrangement means 1903.

Figure 20:
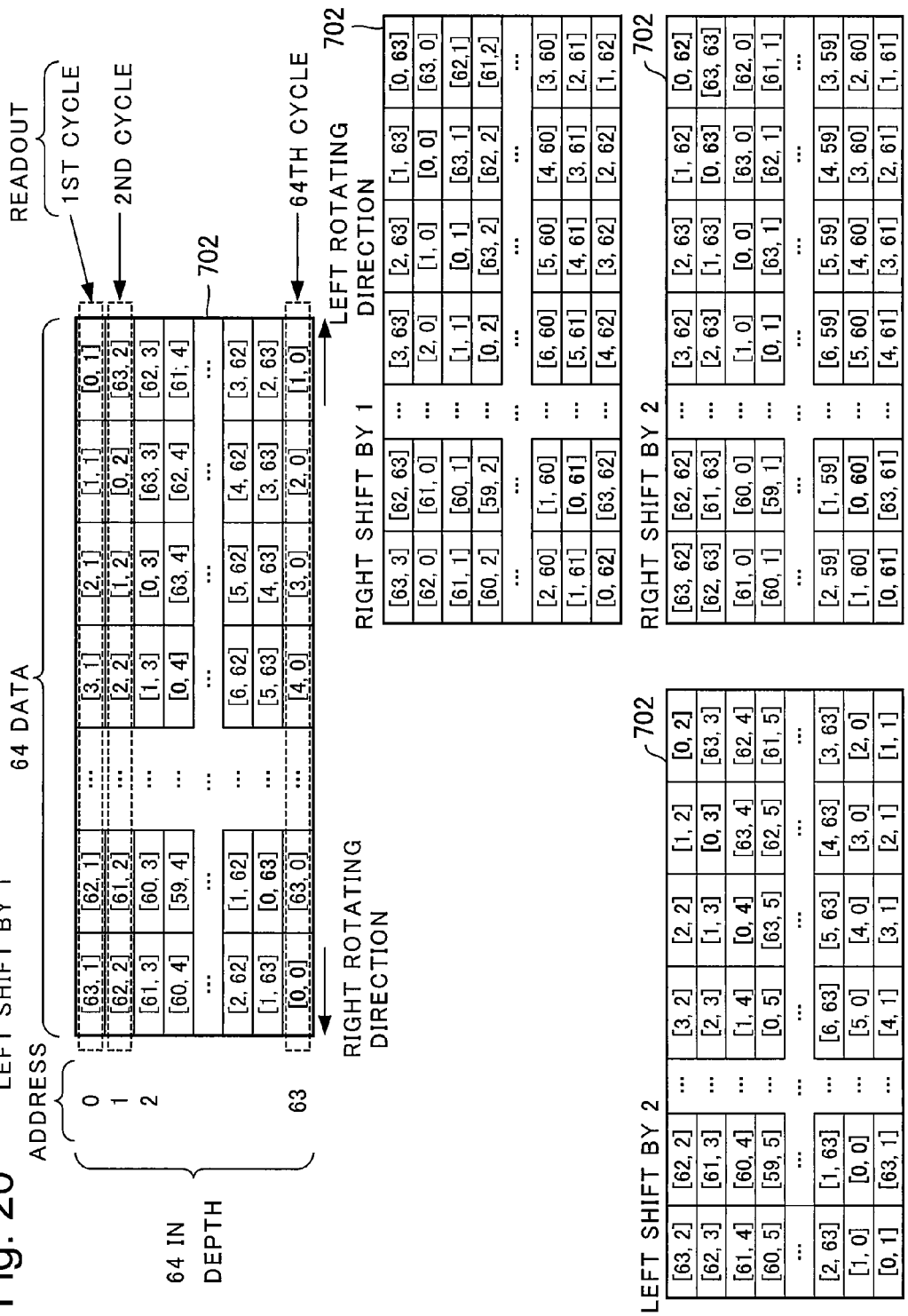
FIG. 20 is a diagram indicating values of the rearrangement-purpose memory with respect to various shift amounts in the third exemplary embodiment of the present invention.

Hereinafter, operations of the write position determination means 1902 will be described in detail. Positions at which the write position determination means 1902 writes results of the first FFT means 101 into the rearrangement-purpose memory 102 are illustrated in FIG. 20, by taking for examples a left shift by 1, a left shift by 2, a right shift by 1, and a right shift by 2. As for the write positions, results of the first FFT means are rotated by (X %64) pieces to the right in the case of a left shift by X, and are rotated by (X %64) pieces to the left in the case of a right shift by X.

The first rearrangement means 1903 performs rearrangement so that the results are the same as in FIG. 11. In other words, in the case of a left shift by 1, no rearrangement is performed in the 1 to 63 cycles, and results are rotated left by 1 only in the 64 cycle. Furthermore, in the case of a left shift by 2, no rearrangement is performed in the 1 to 62 cycles, and results are rotated left by 1 only in the 63 and 64 cycles. Furthermore, in the case of a right shift by 1, results are rotated right by 1 only in the 1 cycle, and no rearrangement is performed in the 2 to 64 cycles. Furthermore, in the case of a right shift by 2, results are rotated right by 1 only in the 1 and 2 cycles, and no rearrangement is performed in the 3 to 64 cycles.

By providing a construction as described above, the frequency offset compensation can be realized. In this exemplary embodiment, changing the readout position corresponding to the frequency offset compensation amount in the second exemplary embodiment is merely altered to changing the write position corresponding to the frequency offset compensation amount. Therefore, the effects of the exemplary embodiment are the same as those of the second exemplary embodiment.

Fourth Exemplary Embodiment

Figure 21:
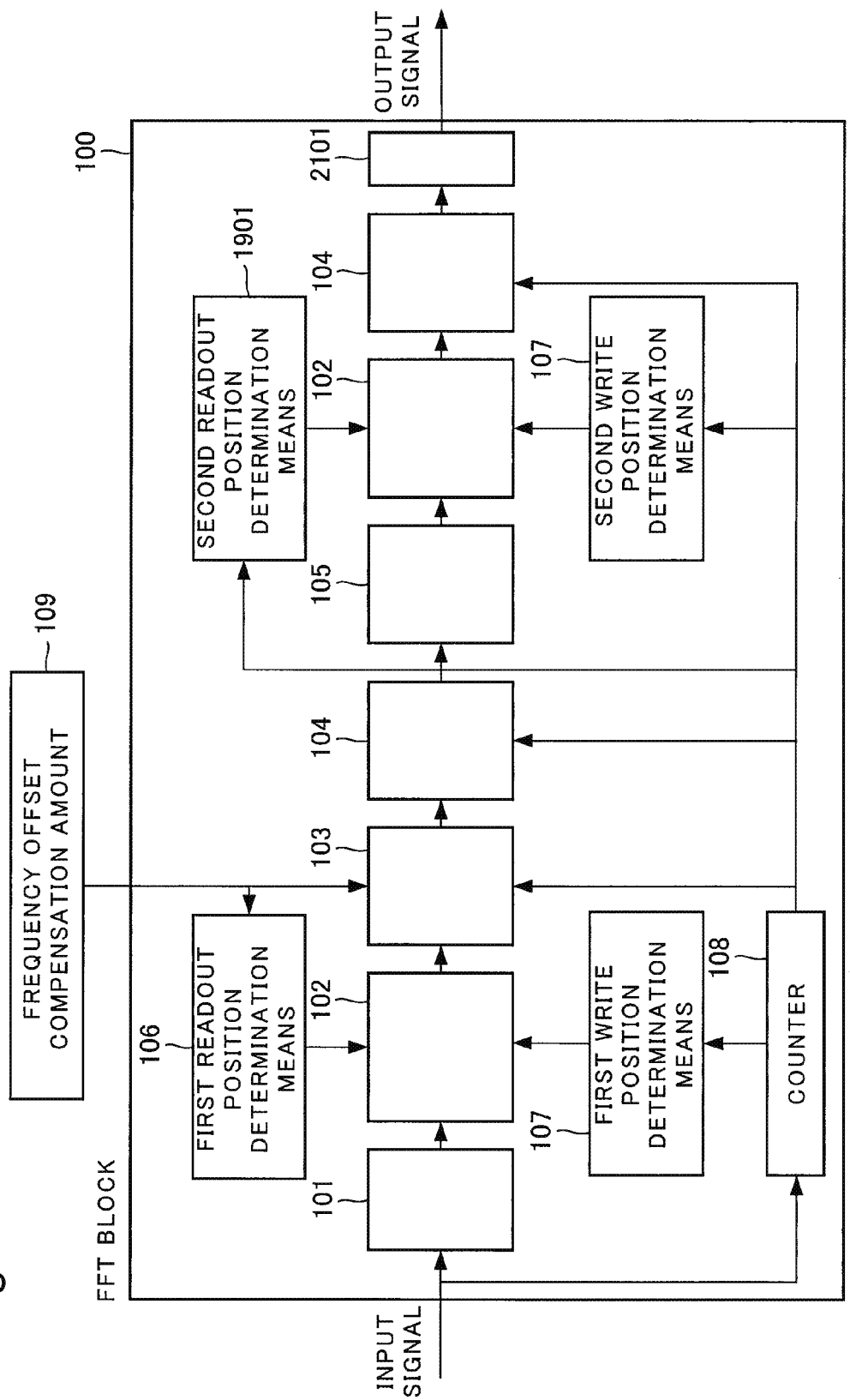
FIG. 21 is a block diagram illustrating a construction of a fourth exemplary embodiment of the present invention.
Figure 22:
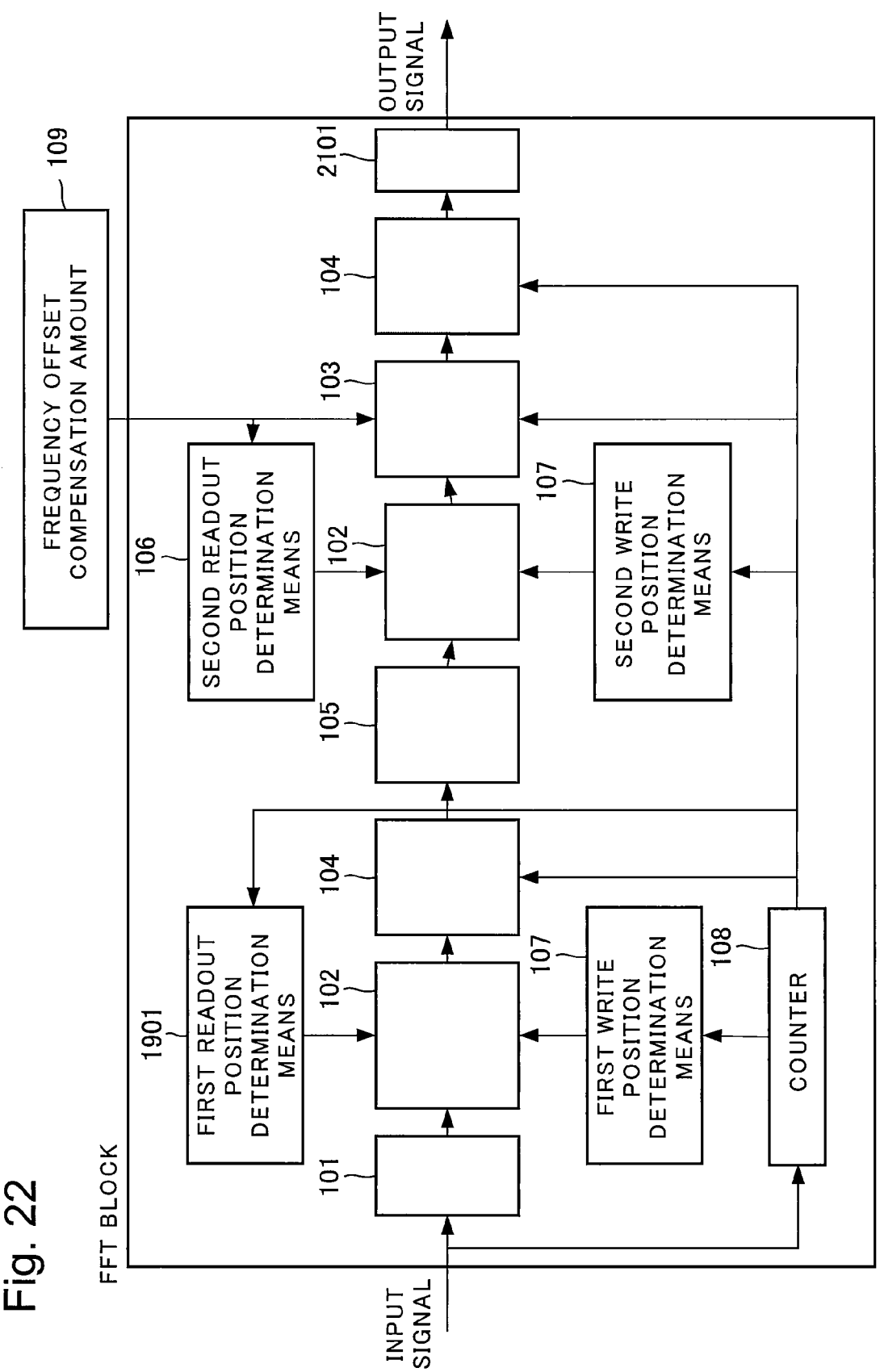
FIG. 22 is a block diagram illustrating a construction of the fourth exemplary embodiment of the present invention.

A fourth embodiment of the present invention will be described with reference to the drawings. This exemplary embodiment is about the case where there are three FFT means. FIG. 21 and FIG. 22 are block diagrams illustrating constructions of this exemplary embodiment. FIG. 21 is about a method in which readout position determination means 106 and first rearrangement means 103 are interposed between first FFT means 101 and second FFT means 105. Furthermore, FIG. 22 is about a method in which readout position determination means 106 and first rearrangement means 103 are interposed between second FFT means 105 and third FFT means 2101.

Regarding both FIG. 21 and FIG. 22, the obtained effects are substantially the same as those of the second exemplary embodiment and the third exemplary embodiment. Furthermore, even when an FFT block 100 is divided into four or more FFTs, provision of readout position determination means and first rearrangement means between any of the FFTs makes it possible to perform frequency offset compensation. Furthermore, although in this exemplary embodiment, the second exemplary embodiment is applied to the case where the FFT block is divided into three or more FFTs, it is also possible to apply the third exemplary embodiment in substantially the same manner.

Fifth Exemplary Embodiment

Figure 23:
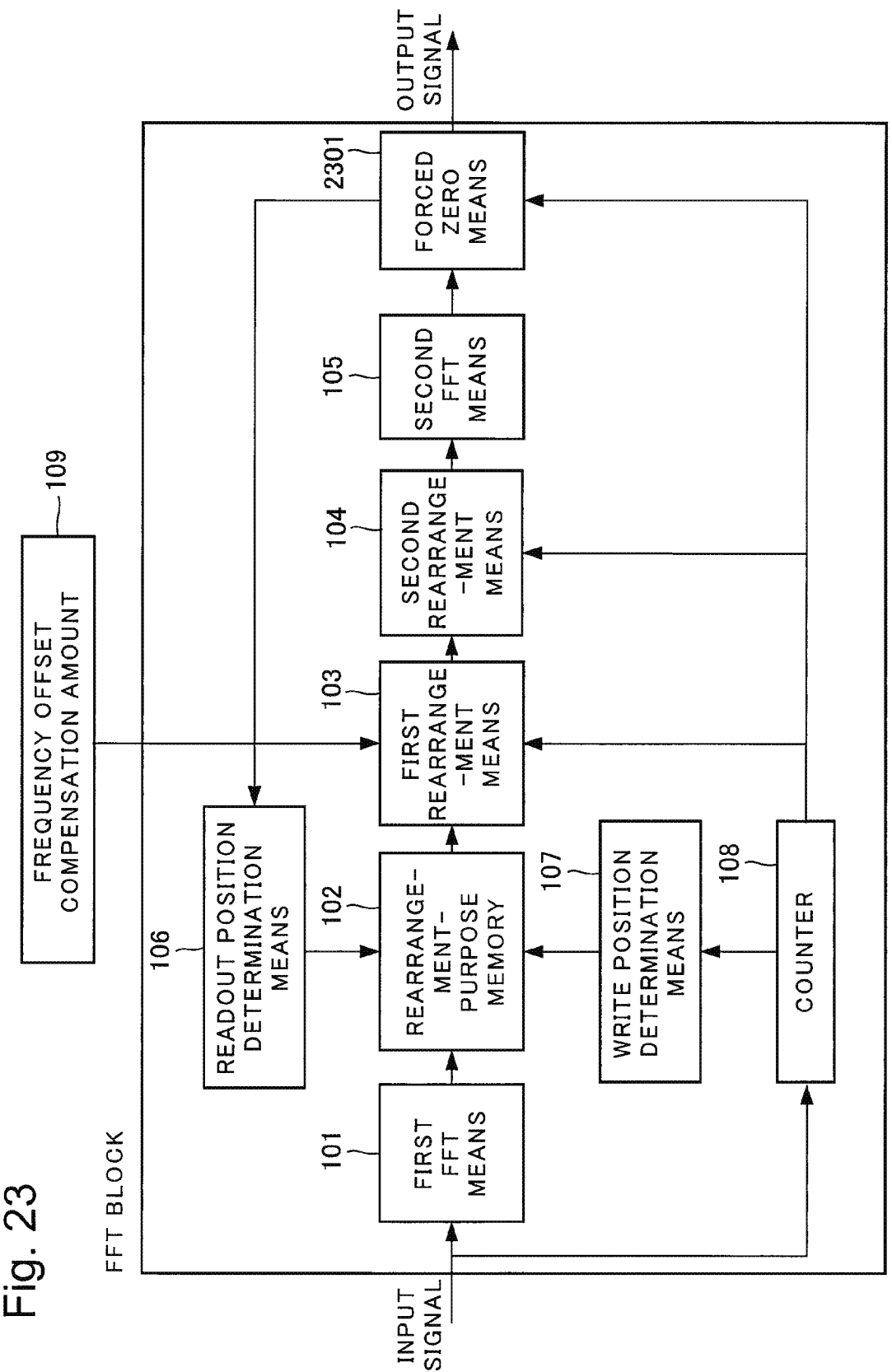
FIG. 23 is a block diagram illustrating a construction of a fifth exemplary embodiment of the present invention.

A fifth exemplary embodiment of the present invention will be described with reference to the drawings. FIG. 23 is a block diagram illustrating a construction of this exemplary embodiment. This exemplary embodiment is an exemplary embodiment in which forced zero means 2301 has been added to the second exemplary embodiment. Means other than the forced zero means 2301 are the same as in the second exemplary embodiment.

The forced zero means 2301 is means for forcing one or more of data output from the second FFT means 105 to be zero and immediately outputting the other values as is. The locations and quantities to be subjected to forced zero are determined based on the frequency offset compensation amount 109. When the number of points of FFTs is 4096, for example, only 2048 is turned into 0 in the case of a left shift by 1, and only 2047 and 2048 are turned into 0 in the case of a left shift by 2. Conversely, in the case of a right shift by 1, only 2049 is turned into 0, and in the case of a right shift by 2, only 2049 and 2050 are turned into zero. The data that the forced zero means needs to turn into zero is calculated based on the frequency offset compensation amount 109 and the value of the counter 108.

Figure 24:
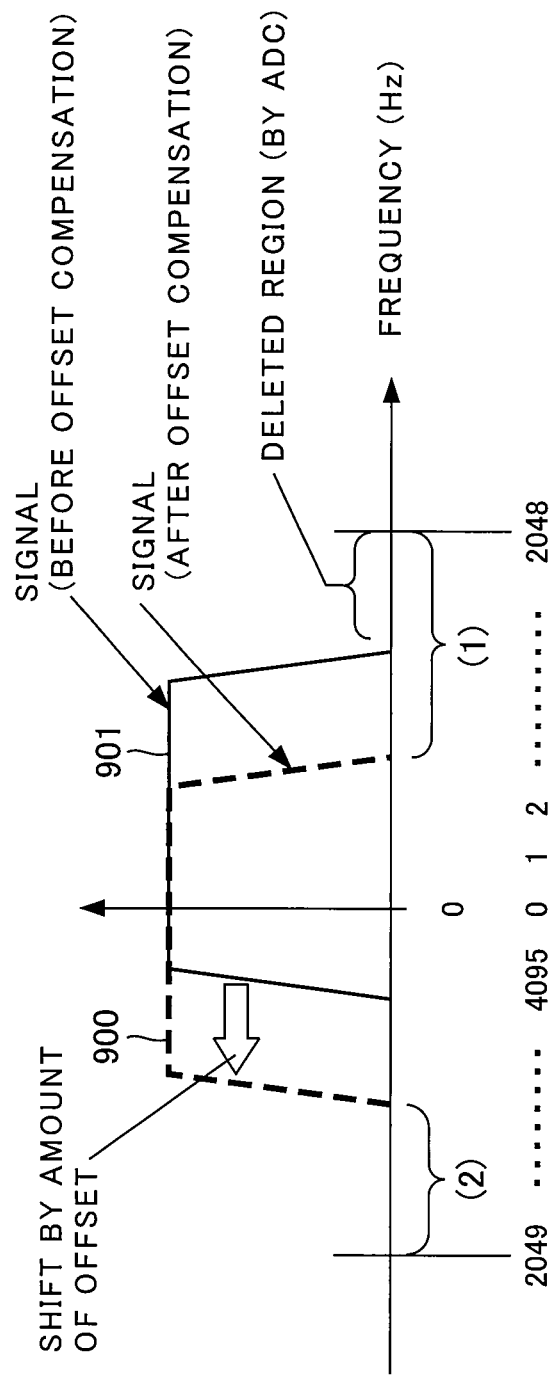
FIG. 24 is a diagram for describing an operation of forced zero means.

Next, effects of this exemplary embodiment will be described. In the case of a discrete-time Fourier transform, the upper limit of the frequency that can be expressed by the digital signal concerned is half the sampling frequency. In this exemplary embodiment, the forced zero means 2301 turns output values into zero, as illustrated in FIG. 24, in a portion of a frequency region ((1) in FIG. 24) which can become newly expressible according to a shift operation by an amount of a frequency offset despite having been inexpressible before the shift. This operation works as follows. Although in the second exemplary embodiment, the site of (2) in FIG. 24 seems to be (1), the site has theoretically already been cut (cut by a band-pass filter preceding the ADC). Because the forced zero means 2301 turns this portion into zero, a more ideal operation results.

Furthermore, although in this exemplary embodiment, only one side is subjected to the forced zeroing, there are cases where an ideal waveform has symmetry, and a configuration in which both sides are subjected to the zeroing is also possible. In other words, a configuration in which not only (1) but also (2) in FIG. 24 is subjected to the zeroing is also possible.

Sixth Exemplary Embodiment

Figure 25:
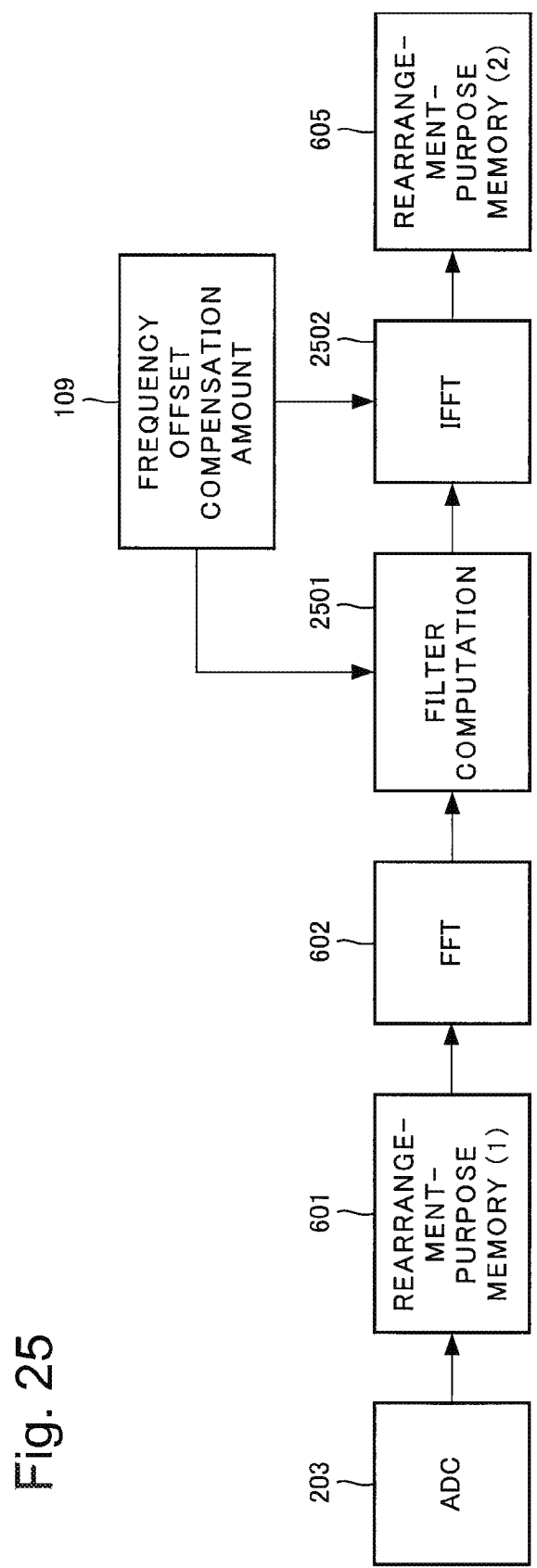
FIG. 25 is a block diagram illustrating a construction of a sixth exemplary embodiment of the present invention.

A sixth exemplary embodiment of the present invention will be described with reference to the drawings. FIG. 25 is a block diagram illustrating a construction of this exemplary embodiment. This exemplary embodiment is a method in which a frequency offset compensation is performed inside an IFFT 2502, not an FFT 602. Operations inside the IFFT 2501 are the same as in the FFT 101 in the second exemplary embodiment.

Figure 26:
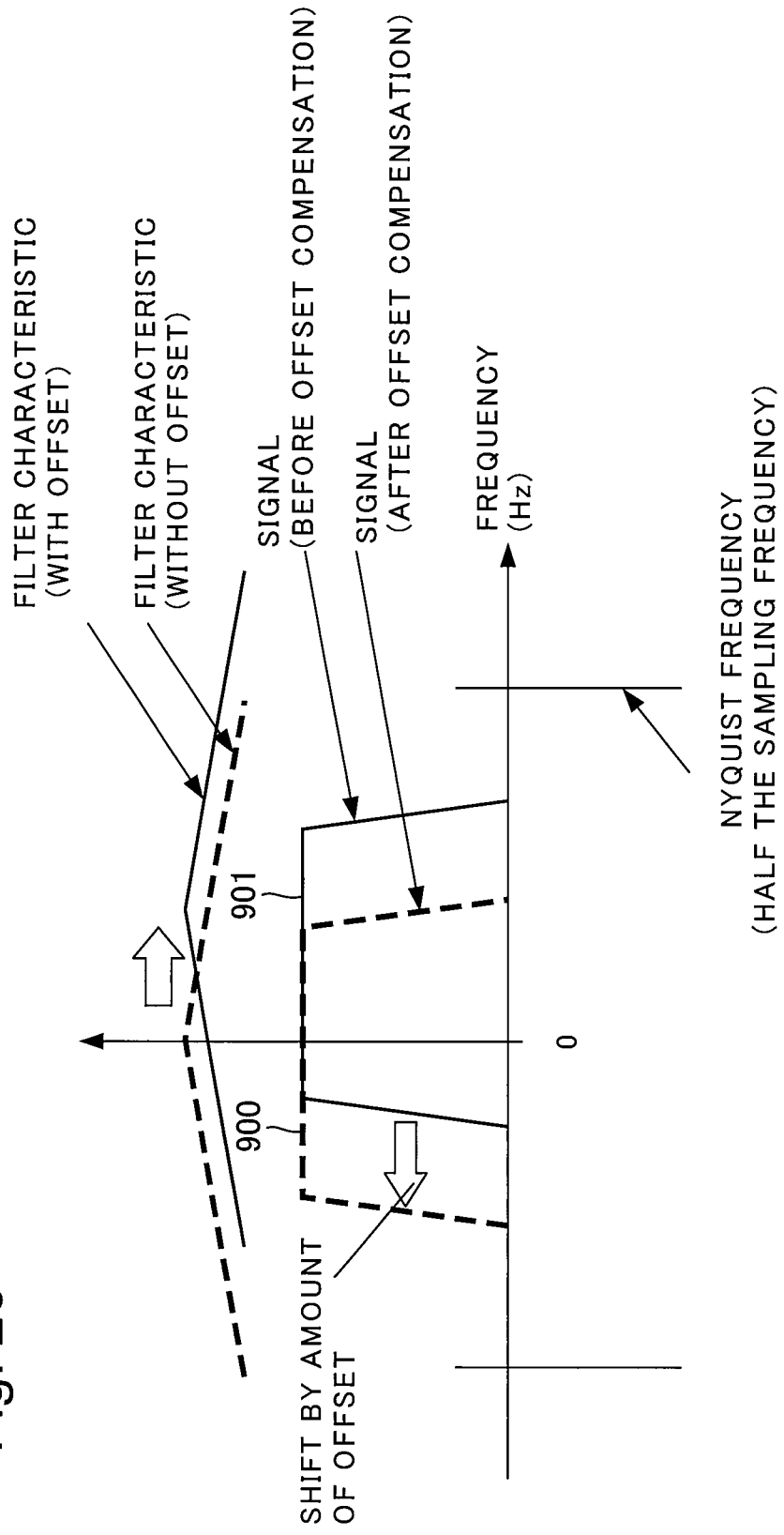
FIG. 26 is a diagram for describing an operation of the sixth exemplary embodiment of the present invention.

However, in this exemplary embodiment, a filter computation 2501 needs to be changed as illustrated in FIG. 25. When a frequency offset compensation is carried out by an FFT and then the filter computation is performed as in the second exemplary embodiment, it suffices that, in FIG. 26, a dotted-line signal (after frequency offset compensation) 900 is multiplied by a dotted-line filter characteristic (without offset). On the other hand, when a frequency offset is performed by an IFFT, a solid-line signal not having been subjected to an offset compensation (before frequency offset compensation) 901 is input to the filter computation 2501. Therefore, the filter characteristic also needs to be a solid-line filter characteristic (with offset) obtained by performing a reverse shift by an amount of frequency offset. Specifically, in the filter computation 2501, the solid line filter characteristic (with offset) obtained by shifting the filter characteristic based on the frequency offset compensation amount 109 and results of the FFT 602 are multiplied by each other. As a result, the effects of the frequency offset compensation at the IFFT 2502 can be made the same as in the second exemplary embodiment.

As above, according to this exemplary embodiment, it becomes possible to perform the frequency offset compensation by utilizing original construction elements that constitute an FFT and an IFFT. Accordingly, the frequency offset compensation can be performed without a need for a new complex multiplier or memory. As a result, the circuit area can be reduced in the system as a whole, and furthermore, problems, such as increased electric power consumption, reduced yield of chips, and the like, are solved.

This exemplary embodiment can be applied to uses such as optical digital coherent communication or the like. Furthermore, the exemplary embodiment is applicable to a system with a frequency offset, such as wireless communication or the like.

It goes without saying that the present invention is not limited to the foregoing exemplary embodiments but various modifications are possible within the scope of the invention described in Claims, and are encompassed within the scope of the present invention. Furthermore, a part or the whole of the foregoing exemplary embodiments can be described as in the following supplementary notes, but are not limited to the following.

Supplementary Notes
(Supplementary Note 1)

A frequency offset compensation apparatus that includes: first FFT means for performing a discrete-time Fourier transform of an input signal; second FFT means for performing a discrete-time Fourier transform; and offset compensation means for changing an order of output data of the first FFT means according to a frequency offset compensation amount, rearranging the output data put in the order pursuant to the frequency offset compensation amount, and then inputting the output data to the second FFT means.

(Supplementary Note 2)

The frequency offset compensation apparatus according to Supplementary Note 1, wherein the offset compensation means includes: rearrangement-purpose memory means for writing in the output data of the first FFT means and for performing rearrangement of the data for inputting the data to the second FFT means; write position determination means for determining positions at which the output data are to be written in the rearrangement-purpose memory means; readout position determination means for determining a reading-out order of the output data written in the rearrangement-purpose memory means based on the frequency offset compensation amount; first rearrangement means for rearranging the output data corresponding to the order at which the output data have been read out based on the frequency offset compensation amount; and second rearrangement means for rearranging the output data rearranged by the first rearrangement means and then inputting the output data to the second FFT means.

(Supplementary Note 3)

The frequency offset compensation apparatus according to Supplementary Note 2, wherein: the offset compensation means includes counter means for counting the order of the input signal; the write position determination means determines the positions at which the output data are to be written in the rearrangement-purpose memory means based on a count value of the counter means; the readout position determination means determines the reading-out order of the output data written in the rearrangement-purpose memory means based on the frequency offset compensation amount; the first rearrangement means rearranges the output data corresponding to the order in which the output data have been read out in the reading-out order based on the count value of the counter means and the frequency offset compensation amount; and the second rearrangement means rearranges the output data rearranged by the first rearrangement means based on the count value of the counter means and then inputs the output data to the second FFT means.

(Supplementary Note 4)

The frequency offset compensation apparatus according to Supplementary Note 1, wherein the offset compensation means includes: rearrangement-purpose memory means for writing in the output data of the first FFT means and for performing rearrangement of the data for inputting the data to the second FFT means; write position determination means for determining positions at which the output data are to be written in the rearrangement-purpose memory means based on the frequency offset compensation amount; readout position determination means for determining a reading-out order of the output data written in the rearrangement-purpose memory means; first rearrangement means for rearranging the output data corresponding to the order at which the output data have been read out based on the frequency offset compensation amount; and second rearrangement means for rearranging the output data rearranged by the first rearrangement means and then inputting the output data to the second FFT means.

(Supplementary Note 5)

The frequency offset compensation apparatus according to Supplementary Note 4, wherein: the offset compensation means includes counter means for counting the order of the input signal; the write position determination means determines the positions at which the output data are to be written in the rearrangement-purpose memory means based on the frequency offset compensation amount; the readout position determination means determines the reading-out order of the output data written in the rearrangement-purpose memory means based on a count value of the counter means; the first rearrangement means rearranges the output data corresponding to the order in which the output data have been read out in the reading-out order based on the count value of the counter means and the frequency offset compensation amount; and the second rearrangement means rearranges the output data rearranged by the first rearrangement means based on the count value of the counter means and then inputs the output data to the second FFT means.

(Supplementary Note 6)

The frequency offset compensation apparatus according to one of Supplementary Notes 1 to 5, wherein at least one of the first FFT means or the second FFT means is an inverse discrete-time Fourier transform.

(Supplementary Note 7)

The frequency offset compensation apparatus according to one of Supplementary Notes 1 to 6, wherein after the second FFT means, forced zero means for turning a predetermined output value of the second FFT means into zero is provided.

(Supplementary Note 8)

The frequency offset compensation apparatus according to Supplementary Note 7, wherein the forced zero means turns the output value into zero based on the frequency offset compensation amount.

(Supplementary Note 9)

A frequency offset compensation method wherein: an input signal is subjected to a first discrete-time Fourier transform; an order of output data having been subjected to the first discrete-time Fourier transform is changed according to a frequency offset compensation amount; the output data put in the order pursuant to the frequency offset compensation amount are rearranged; and the output data rearranged are subjected to a second discrete-time Fourier transform.

(Supplementary Note 10)

The frequency offset compensation method according to Supplementary Note 9, wherein: write positions at which the output data having been subjected to the first discrete-time Fourier transform are to be written in a memory are determined; the output data are written in at the write position; a reading-out order of the output data written at the write positions is determined; and the output data read out in the reading-out order are subjected to a first rearrangement; the output data having been subjected to the first rearrangement are subjected to a second rearrangement and then to the second discrete-time Fourier transform.

(Supplementary Note 11)

The frequency offset compensation method according to Supplementary Note 10, wherein, based on the frequency offset compensation amount, the reading-out order is determined or the write positions are determined.

(Supplementary Note 12)

The frequency offset compensation method according to Supplementary Note 10 or 11, wherein the first rearrangement rearranges the output data based on the frequency offset compensation amount.

(Supplementary Note 13)

The frequency offset compensation method according to one of Supplementary Notes 9 to 12, wherein at least one of the first discrete-time Fourier transform and the second discrete-time Fourier transform performs an inverse Fourier transform.

(Supplementary Note 14)

The frequency offset compensation method according to one of Supplementary Notes 9 to 13, wherein after the second discrete-time Fourier transform, a predetermined output value from the second discrete-time Fourier transform is turned into zero.

(Supplementary Note 15)

The frequency offset compensation method according to Supplementary Note 14, wherein the output value is turned into zero based on the frequency offset compensation amount.

This application claims the benefit of the priority based on Japanese Patent Application No. 2012-277818 filed on Dec. 20, 2012, the disclosure of which is incorporated herein in its entirety.

INDUSTRIAL APPLICABILITY

The present invention relates to a frequency offset compensation technology for a coherent optical receiver in optical communication, and can be used in optical communication systems.

REFERENCE SIGNS LIST

100 FFT block
101 First FFT means
102 Rearrangement-purpose memory
103 First rearrangement means
104 Second rearrangement means
105 Second FFT means
106 Readout position determination means 107 Write position determination means
108 Counter
109 Frequency offset compensation amount
110, 111 Offset compensation means
200 Light frequency mixer
201 Local oscillating laser
202 PD (photodiode)
203 ADC
204 Frequency offset compensator
205 Equalizer
206 Integrator
207 Frequency offset estimator
208 Phase estimator
209 Data restoration
210 Digital signal processing unit
300 FFT block
301 FFT block
302 64-point FFT
303 Rearrangement-purpose memory
601 Rearrangement-purpose memory (1)
602 FFT
603 Filter computation (complex multiplier)
604 IFFT
605 Rearrangement-purpose memory (2)
701 1R1W memory
702 Arrangement of 64 1R1W memories
900 Signal (after frequency offset compensation)
901 Signal (before frequency offset compensation)
1901 Readout position determination means
1902 Write position determination means
1903 First rearrangement means
2101 Third FFT means
2301 Forced zero means
2501 Filter computation (complex multiplier)
2502 IFFT

What is claimed is:

1. A frequency offset compensation apparatus comprising:
a first FFT circuit for performing a discrete-time Fourier transform of an input signal; a second FFT circuit for performing a discrete-time Fourier transform; and
an offset compensation circuit for changing an order of output data of the first FFT circuit according to a frequency offset compensation amount, rearranging the output data put in the order pursuant to the frequency offset compensation amount, and then inputting the output data to the second FFT circuit.

2. The frequency offset compensation apparatus according to claim 1, wherein
the offset compensation circuit includes:
a rearrangement-purpose memory circuit for writing in the output data of the first FFT circuit and for performing rearrangement of the data for inputting the data to the second FFT circuit;
a write position determination circuit for determining positions at which the output data are to be written in the rearrangement-purpose memory circuit;
a readout position determination circuit for determining a reading-out order of the output data written in the rearrangement-purpose memory circuit based on the frequency offset compensation amount;
a first rearrangement circuit for rearranging the output data corresponding to the order at which the output data have been read out based on the frequency offset compensation amount; and
a second rearrangement circuit for rearranging the output data rearranged by the first rearrangement circuit and then inputting the output data to the second FFT circuit.

3. The frequency offset compensation apparatus according to claim 2, wherein:
the offset compensation circuit includes a counter circuit for counting the order of the input signal;
the write position determination circuit determines the positions at which the output data are to be written in the rearrangement-purpose memory circuit based on a count value of the counter circuit;
the readout position determination circuit determines the reading-out order of the output data written in the rearrangement-purpose memory circuit based on the frequency offset compensation amount;
the first rearrangement circuit rearranges the output data corresponding to the order in which the output data have been read out in the reading-out order based on the count value of the counter circuit and the frequency offset compensation amount; and
the second rearrangement circuit rearranges the output data rearranged by the first rearrangement circuit based on the count value of the counter circuit and then inputs the output data to the second FFT circuit.

4. The frequency offset compensation apparatus according to claim 1, wherein the offset compensation circuit includes:
a rearrangement-purpose memory circuit for writing in the output data of the first FFT circuit and for performing rearrangement of the data for inputting the data to the second FFT circuit;
a write position determination circuit for determining positions at which the output data are to be written in the rearrangement-purpose memory circuit based on the frequency offset compensation amount;
a readout position determination circuit for determining a reading-out order of the output data written in the rearrangement-purpose memory circuit;
a first rearrangement circuit for rearranging the output data corresponding to the order at which the output data have been read out based on the frequency offset compensation amount; and
a second rearrangement circuit for rearranging the output data rearranged by the first rearrangement circuit and then inputting the output data to the second FFT circuit.

5. The frequency offset compensation apparatus according to claim 4, wherein:
the offset compensation circuit includes counter circuit for counting the order of the input signal;
the write position determination circuit determines the positions at which the output data are to be written in the rearrangement-purpose memory circuit based on the frequency offset compensation amount;
the readout position determination circuit determines the reading-out order of the output data written in the rearrangement-purpose memory circuit based on a count value of the counter circuit;
the first rearrangement circuit rearranges the output data corresponding to the order in which the output data have been read out in the reading-out order based on the count value of the counter circuit and the frequency offset compensation amount; and
the second rearrangement circuit rearranges the output data rearranged by the first rearrangement circuit based on the count value of the counter circuit and then inputs the output data to the second FFT circuit.

6. The frequency offset compensation apparatus according to claim 1, wherein at least one of the first FFT circuit or the second FFT circuit is an inverse discrete-time Fourier transform.

7. The frequency offset compensation apparatus according to claim 1, wherein after the second FFT circuit, a forced zero circuit for turning a predetermined output value of the second FFT circuit into zero is provided.

8. A frequency offset compensation method wherein:

by a frequency offset compensation apparatus, an input signal is subjected to a first discrete-time Fourier transform;

an order of output data having been subjected to the first discrete-time Fourier transform is changed according to a frequency offset compensation amount;

the output data put in the order pursuant to the frequency offset compensation amount are rearranged; and the output data rearranged are subjected to a second discrete-time Fourier transform.

9. The frequency offset compensation method according to claim 8, wherein:

by the frequency offset compensation apparatus, write positions at which the output data having been subjected to the first discrete-time Fourier transform are to be written in a memory are determined;

the output data are written in at the write position;

a reading-out order of the output data written at the write positions is determined;

the output data read out in the reading-out order are subjected to a first rearrangement; and the output data having been subjected to the first rearrangement are subjected to a second rearrangement and then to the second discrete-time Fourier transform.

10. The frequency offset compensation method according to claim 9, wherein, by the frequency offset compensation apparatus, based on the frequency offset compensation amount, the reading-out order is determined or the write positions are determined.

* * * * *